US012792514B2

(12) United States Patent
Cooper et al.

(10) Patent No.: US 12,792,514 B2
(45) Date of Patent: Nov. 10, 2026

(54) SYSTEM AND METHOD FOR ENDPOINT-AWARE ADAPTIVE PROTOCOL CACHING WITH SEMANTIC DEDUPLICATION IN HETEROGENEOUS NETWORKS

(71) Applicant: AtomBeam Technologies Inc., Moraga, CA (US)

(72) Inventors: Joshua Cooper, Columbia, SC (US); Charles Yeomans, Orinda, CA (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/328,190

(22) Filed: Sep. 14, 2025

(65) Prior Publication Data

US 2026/0010476 A1 Jan. 8, 2026

Related U.S. Application Data

(63) Continuation-in-part of application No. 19/044,355, filed on Feb. 3, 2025, now Pat. No. 12,417,136, which
(Continued)

(51) Int. Cl.
*G06F 12/0811* (2016.01)

(52) U.S. Cl.
CPC .. *G06F 12/0811* (2013.01); *G06F 2212/1016* (2013.01)

(58) Field of Classification Search
CPC ......... G06F 12/0811; G06F 2212/1016; G06F 12/0815; H04L 67/5682; H04L 67/568;
(Continued)

(56) References Cited

U.S. PATENT DOCUMENTS 6,668,319 B1 * 12/2003 Newell, Jr. ........ G05B 19/0426 370/466
6,885,749 B1 4/2005 Chang et al.
(Continued)

OTHER PUBLICATIONS

Meslet-Millet, Fabien et al.; "DCH: A Deep Learning Approach To Universal Header Compression For The Internet of Things," In Proceedings of the International ACM Conference on Modeling. Analysis and Simulation of Wireless and Mobile Systems (MSWIM '23) (pp. 269-276). Association for Computing Machinery Inc. DOI: 10.I 145/3616388.3617522.

*Primary Examiner* — Michael Alsip
(74) *Attorney, Agent, or Firm* — GALVIN PATENT LAW LLC; Brian R. Galvin; Erin L. Johnston

(57) ABSTRACT

A system for adaptively caching network communication protocols enhances efficiency across heterogeneous device environments through a multi-level cache architecture with device-capability-based tiers. The system collects endpoint telemetry data including device capabilities and operational constraints to classify endpoints and generate context-aware protocol variants optimized for specific device types. Protocol optimization opportunities are determined through structural analysis of message patterns and state transitions. The system performs protocol deduplication by identifying functionally equivalent variants and maintaining canonical representations to reduce cache redundancy. Cache synchronization across distributed nodes uses enhanced Merkle tree structures with protocol normalization processing. The system predicts communication needs based on historical patterns, network context, and endpoint constraints, enabling proactive cache management tailored to device capabilities. Integration with event-driven data communication systems enables seamless protocol selection and translation while maintaining compatibility between diverse endpoint types,
(Continued)

from high-performance servers to resource-constrained IoT devices.

18 Claims, 13 Drawing Sheets

Related U.S. Application Data is a continuation-in-part of application No. 18/827,741, filed on Sep. 7, 2024, now Pat. No. 12,218,697, which is a continuation-in-part of application No. 18/644,019, filed on Apr. 23, 2024, now Pat. No. 12,136,934, which is a continuation-in-part of application No. 18/501,987, filed on Nov. 4, 2023, now Pat. No. 11,967,974, which is a continuation-in-part of application No. 18/190,044, filed on Mar. 24, 2023, now Pat. No. 11,831,343.

(60) Provisional application No. 63/388,411, filed on Jul. 12, 2022.

(58) Field of Classification Search
CPC ......... H04L 69/08; H04L 69/18; H04L 69/24; H03M 7/6052; H03M 7/3079; G06N 20/00
See application file for complete search history.

(56) References Cited

U.S. PATENT DOCUMENTS 7,103,538 B1 9/2006 Gao
7,519,228 B2 4/2009 Cho et al.
7,629,922 B2 12/2009 Winstead et al.
8,291,097 B2 10/2012 Feingold et al.
8,401,104 B2 3/2013 Clerckx et al.
8,533,456 B2 9/2013 Kholidy
8,677,226 B2 3/2014 Pons et al.
8,688,627 B2 4/2014 Arthursson
8,934,630 B2 1/2015 Hazay et al.
9,071,623 B2 6/2015 Arthursson et al.
9,167,259 B1 10/2015 Eshet et al.
9,503,434 B2 11/2016 Paris et al.
9,531,845 B2 * 12/2016 Huang .................... H04L 69/08
9,742,557 B2 8/2017 Hazay et al.
10,037,306 B2 7/2018 Lin et al.
10,095,635 B2 10/2018 Abbas et al.
10,264,262 B2 4/2019 Swaminathan et al.
10,317,221 B2 6/2019 Ikeda
10,329,410 B2 6/2019 Vange et al.
10,346,043 B2 7/2019 Golden et al.
10,373,458 B2 8/2019 Selinger et al.
10,785,545 B2 9/2020 Metzler et al.
11,057,634 B2 7/2021 Schroers et al.
11,128,935 B2 9/2021 Li
11,172,052 B2 * 11/2021 Ramos Chaves ....... H04L 69/18
11,451,242 B2 9/2022 Choi et al.
11,561,797 B2 1/2023 Patel
12,294,617 B2 * 5/2025 Pratt, Jr. ................ H04L 67/12
2004/0136566 A1 7/2004 Cho et al.
2013/0205003 A1 * 8/2013 Vyas ..................... H04L 69/167 709/224
2014/0164625 A1 * 6/2014 Zhou ....................... H04L 67/00 709/226
2014/0169444 A1 6/2014 Ottaviano et al.
2017/0347100 A1 11/2017 Chou et al.
2018/0196609 A1 7/2018 Niesen
2022/0043778 A1 2/2022 Cooper et al.
2023/0127149 A1 4/2023 Ezrielev et al.

* cited by examiner

SYSTEM AND METHOD FOR ENDPOINT-AWARE ADAPTIVE PROTOCOL CACHING WITH SEMANTIC DEDUPLICATION IN HETEROGENEOUS NETWORKS

CROSS-REFERENCE TO RELATED APPLICATIONS

Priority is claimed in the application data sheet to the following patents or patent applications, each of which is expressly incorporated herein by reference in its entirety:

Ser. No. 19/044,355
Ser. No. 18/827,741
Ser. No. 18/644,019
Ser. No. 18/501,987
Ser. No. 18/190,044
Ser. No. 63/388,411

BACKGROUND OF THE INVENTION

Field of the Art

The present invention is in the field of network protocol optimization, and in particular the usage of adaptive caching combined with data encoding for enhanced communication efficiency and protocol management.

Discussion of the State of the Art

As network complexity continues to grow, particularly with the proliferation of diverse devices and protocols, efficient protocol management has become increasingly critical. Modern networks must handle communications between legacy systems, current technologies, and emerging protocols simultaneously. This diversity creates significant overhead in protocol negotiation and translation, impacting network performance and reliability.

The challenge is compounded by the increasing heterogeneity of network endpoints, ranging from high-performance servers to resource-constrained IoT devices. Traditional approaches to protocol management rely heavily on real-time negotiation and translation, requiring substantial computational resources and introducing latency into network communications. These systems typically employ a one-size-fits-all approach that fails to account for the vastly different capabilities and constraints of diverse endpoints.

While existing protocol caching systems have improved efficiency, they suffer from redundancy issues where functionally equivalent protocols are stored multiple times with minor syntactic variations. This redundancy wastes valuable cache space and synchronization bandwidth. Current systems lack the ability to recognize and consolidate functionally equivalent protocols, leading to inefficient cache utilization across distributed nodes.

Furthermore, existing caching solutions do not adapt to endpoint-specific constraints such as limited memory, processing power, or battery life. Resource-constrained devices are often forced to use protocols designed for high-performance systems, resulting in excessive overhead and poor performance. The inability to generate and cache context-aware protocol variants means that diverse endpoints cannot operate at their optimal efficiency levels.

What is needed is a system and method for adaptive protocol caching that performs endpoint-aware optimization, identifies and deduplicates functionally equivalent protocols, and generates context-specific protocol variants tailored to device capabilities while maintaining compatibility across heterogeneous network environments.

SUMMARY OF THE INVENTION

Accordingly, the inventor has conceived and reduced to practice a system and method for adaptive protocol caching that enhances communication efficiency across heterogeneous network environments through endpoint-aware optimization and protocol deduplication. The system collects and analyzes endpoint telemetry data to understand device capabilities and constraints, enabling generation of context-aware protocol variants optimized for specific device types. Through structural analysis of protocol message patterns and state transitions, the system identifies functionally equivalent protocols and maintains canonical representations to eliminate redundancy. The multi-level cache architecture is organized into device-capability-based tiers, ensuring that endpoints from high-performance servers to resource-constrained IoT devices receive appropriately optimized protocols. Enhanced synchronization mechanisms with protocol normalization minimize bandwidth usage while maintaining cache coherency across distributed nodes.

According to an embodiment, a computer system comprises a hardware memory and is configured to execute software instructions that receive requests for propagation information, generate protocol descriptors, encapsulate the protocol descriptors into packets, transmit the packets between applications, decode received protocol descriptors, process communication protocols based on the decoded protocol descriptors, analyze network traffic, collect endpoint telemetry data including device capabilities and operational constraints, predict communication needs based on historical patterns, current network context, and endpoint constraints, determine protocol optimization opportunities through structural analysis of protocol message patterns and state transitions, generate context-aware protocol variants adapted to endpoint capabilities, update protocol descriptors when optimization is beneficial, translate between protocols when required for communication, and facilitate communication using optimized protocols.

According to an aspect of an embodiment, the computer system maintains a multi-level protocol cache structure comprising local, regional, and global cache levels, wherein the cache structure is organized into device-capability-based tiers that store protocol variants optimized for different endpoint classifications.

According to an aspect of an embodiment, the computer system performs protocol deduplication of cached protocols by identifying functionally equivalent protocol variants through comparison of message flow patterns and behavioral characteristics, and maintains canonical protocol representations to reduce cache redundancy.

According to an aspect of an embodiment, the computer system synchronizes the cache contents across distributed nodes using a Merkle tree structure enhanced with protocol normalization processing that converts protocol variants to standardized forms before synchronization to minimize bandwidth usage.

According to an aspect of an embodiment, collecting endpoint telemetry data comprises monitoring device resource utilization, network interface capabilities, power states, and protocol compatibility issues through a telemetry collection module to dynamically classify endpoints into operational tiers.

According to an aspect of an embodiment, generating context-aware protocol variants comprises creating endpoint-optimized protocol appendices through a protocol adaptation engine that maintains compatibility with base protocols while adapting message structures, timeout values, and compression levels to match device constraints.

According to an aspect of an embodiment, identifying functionally equivalent protocol variants comprises extracting protocol characteristics into feature vectors, comparing message sequences and state machine transitions across protocol variants, and generating protocol fingerprints that enable identification of functionally equivalent protocols despite syntactic differences.

According to an aspect of an embodiment, the computer system implements constraint-based cache eviction policies through an eviction controller that considers endpoint-specific resource limitations and protocol variant effectiveness in addition to usage frequency when determining cache retention.

According to an aspect of an embodiment, protocol normalization processing includes protocol structure standardization, variant resolution using similarity scoring algorithms, and generation of differential updates that account for canonical representation mappings across cache nodes.

The foregoing system embodiments are equally applicable as corresponding method embodiments, wherein the method comprises performing the steps and functions described for the computer system.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION OF THE INVENTION

Figure 1:
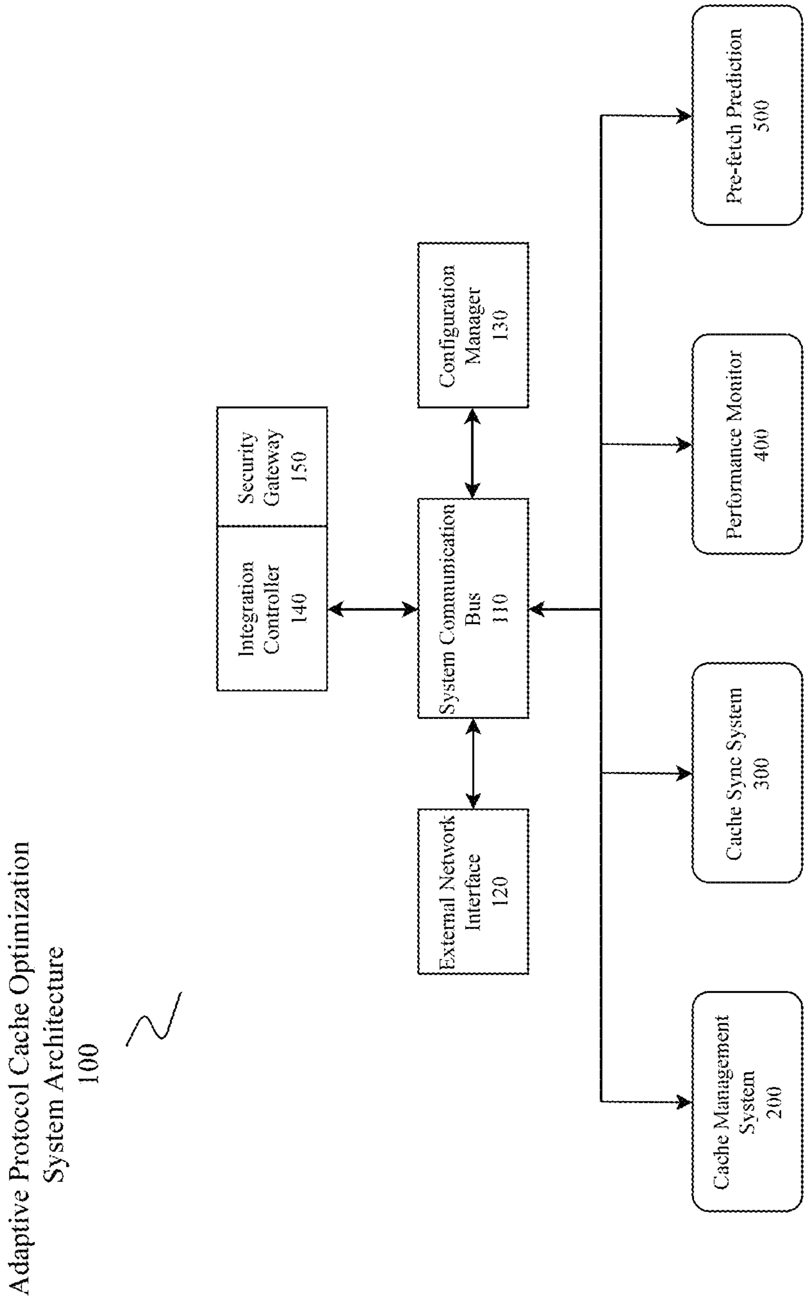
FIG. 1 is a block diagram illustrating exemplary architecture of adaptive protocol cache optimization system.

The inventor has developed a system and method for adaptive protocol caching that improves communication efficiency across diverse computing environments by dynamically tailoring protocol behaviors based on endpoint conditions. The system enables intelligent caching, deduplication, and optimization of protocol data through coordinated subsystems that respond to real-time telemetry, device constraints, and operational contexts.

In the disclosed embodiment, the system comprises integrated subsystems including edge condition feedback engines, protocol structure analysis engines, context-driven optimization logic, tiered caching coordination, and enhanced synchronization frameworks. Each subsystem contributes discrete capabilities toward the broader goal of delivering low-latency, resource-sensitive protocol handling for devices ranging from high-performance servers to memory- and power-constrained embedded systems. The architecture supports modern networks with billions of heterogeneous endpoints while maintaining backward compatibility with existing infrastructure.

Edge condition feedback systems collect and analyze telemetry from endpoint devices to inform caching and optimization decisions. Each endpoint streams telemetry data including CPU class, memory availability, battery state, network type, and supported protocol features. These systems monitor real-time performance characteristics such as packet loss, processing delay, and resource utilization. Persistent connections with endpoints enable adaptive sampling that accounts for stability and bandwidth conditions, allowing the system to balance telemetry granularity against network overhead.

To enable tailored caching strategies, the system classifies endpoints into capability tiers. Devices are grouped based on hardware attributes, software stack compatibility, and historical performance data. For example, classification logic may distinguish between general-purpose laptops, high-availability edge servers, mobile handsets, and embedded IoT nodes. Device group analytics are then used to shape configuration policies across deployment environments, ensuring that each class of device receives protocols optimized for its specific constraints and capabilities.

Constraint analysis logic evaluates telemetry against protocol overhead requirements to determine when a device is nearing or exceeding its operational limits. The system identifies optimization opportunities by comparing protocol performance metrics against current constraints, producing recommendations for protocol simplification, compression, or variant selection. When thresholds are breached or degraded operation is predicted, alerts trigger further optimization or fallback. This proactive approach prevents performance degradation before it impacts user experience.

The feedback architecture includes aggregation layers that consolidate telemetry across geographical and logical groupings. Statistical models are applied to detect cross-device patterns such as shared bottlenecks or regional constraints. These aggregates are used to train predictive models that anticipate future resource limits or optimization demand. Historical telemetry is retained in compressed form according to configurable retention policies, balancing storage efficiency with the need for long-term trend analysis.

Machine learning components enhance system operation through pattern recognition and predictive modeling. Training data derived from telemetry streams, cache performance metrics, and protocol usage patterns enables models to predict future protocol requirements, identify optimization opportunities, and detect anomalous behaviors. These models may employ supervised learning for protocol classification, unsupervised learning for pattern discovery, or reinforcement learning for cache policy optimization. Model outputs influence pre-fetching decisions, tier assignments, and variant generation strategies, while continuous learning mechanisms allow models to adapt as network conditions and device populations evolve. The system may implement model versioning and rollback capabilities to ensure stable operation during model updates.

Protocol structure analysis systems enable intelligent detection of equivalent protocol variants across the network. These systems parse protocol behaviors—including state transitions, message flow structures, and transformation semantics—to identify functionally identical implementations that differ only in superficial aspects such as encoding format or field order. Protocol fingerprints are generated using structural and behavioral analysis techniques, creating unique identifiers that capture functional essence while ignoring syntactic variations.

Feature extraction transforms protocol definitions into multi-dimensional vectors that describe their operational characteristics. Syntax trees are constructed for messages and state machines, allowing structural normalization across different protocol implementations. Invariant features are identified across protocol implementations and used to populate similarity matrices for clustering or classification. This process reduces redundancy by recognizing equivalent protocols across disparate deployments, even when those protocols were developed independently or use different encoding schemes.

Canonicalization logic generates standard representations for functionally equivalent protocols. These canonical forms retain all functional behaviors while eliminating duplicative variations that waste cache space and synchronization bandwidth. A reversible mapping is maintained between each original variant and its canonical form to support compliance, traceability, and rollback. Version control mechanisms ensure that canonical definitions evolve in a controlled manner, supporting transformation validation for correctness while maintaining backward compatibility with deployed systems.

Deduplication controllers govern the consolidation of equivalent protocol entries across distributed cache layers. Conflict resolution strategies are implemented to arbitrate between overlapping protocol candidates, relying on precedence rules, usage history, or administrative policy. All deduplication events are recorded in audit logs, including decision rationale and timestamps, to support validation and traceability. The system may implement graduated deduplication strategies that become more aggressive as cache pressure increases.

Context-aware optimization systems generate device-specific protocol variants based on environmental constraints. These systems consume telemetry, classification results, and constraint analysis data to derive optimization profiles tailored to specific operational contexts. Each profile balances performance, compatibility, and resource conservation, allowing operation in specialized contexts such as low-power, high-security, or high-latency environments. The optimization process considers both immediate device constraints and broader network conditions to ensure system-wide efficiency.

Protocol variants are created through a transformation process that respects the semantic integrity of the base protocol while adapting to device limitations. Field truncation, encoding adjustments, timeout reconfiguration, and message compression are applied according to the capabilities of the target device. These adaptations are validated against compatibility matrices to ensure correct operation under constrained conditions, with particular attention paid to maintaining interoperability between variants used by different device classes.

The system maintains a protocol variant manager that tracks all generated variants, including metadata such as origin context, optimization parameters, and usage history. Variant lineage is recorded to map relationships between base protocols and their derivatives, enabling impact analysis when base protocols are updated. When responding to runtime requests, the system selects appropriate variants using condition-matching APIs that consider device class, network state, and operational profile. Variant effectiveness is continuously monitored to inform future optimization decisions.

Tiered cache coordination logic improves efficiency by structuring cache entries into logical tiers based on compatibility requirements. Each tier corresponds to a device capability profile—such as full-featured, standard, constrained, or ultra-lightweight—and holds protocol variants appropriate to its target class. Tier assignments are dynamic and responsive to usage trends and population shifts, automatically rebalancing as the device ecosystem evolves.

A mapping layer connects logical tiers to physical cache locations without requiring modifications to the underlying cache infrastructure. Compatibility matrices, resource thresholds, and operational tags are stored alongside cache entries, allowing precise routing of protocol fetch and storage operations. Devices query the cache through tier-aware lookup interfaces that optimize retrieval latency and storage efficiency. This abstraction layer enables the system to adapt to different cache implementations while maintaining consistent tier-based organization.

Constraint-based policy engines determine eviction, retention, and pre-fetch strategies based on tier membership and current system state. These policies influence underlying cache behavior through overlay scoring mechanisms that steer but do not override core eviction logic. The policy engine supports inheritance and override functionality, allowing administrators to define global and tier-specific rules that reflect operational priorities. Policies may be updated dynamically based on observed performance metrics and changing business requirements.

Cross-tier coordination modules manage the movement of protocols between tiers as access patterns evolve. When access frequency or device population changes, entries can be promoted or demoted to ensure optimal availability and resource use. Protocol sharing between tiers is permitted when compatibility allows, and spillover strategies handle capacity constraints without service degradation. The coordination logic prevents tier thrashing through hysteresis mechanisms that require sustained access pattern changes before tier migrations occur.

Protocol structure synchronization gateways introduce deduplication intelligence into the protocol synchronization process without altering core synchronization infrastructure. These gateways intercept synchronization events using transparent proxy mechanisms, allowing preprocessing of protocol entries before they are transmitted or committed. This approach maintains compatibility with existing synchronization protocols while adding value through intelligent data reduction.

During preprocessing, protocol variants are analyzed for functional equivalence and converted to canonical forms where appropriate. This reduces duplication during synchronization and ensures consistency across distributed nodes. Structure-aware hash values are generated to maintain compatibility with tree-based synchronization schemes, preserving data integrity during conflict detection while enabling efficient difference computation.

Normalization logic ensures that each synchronized protocol is stored in its most efficient form while maintaining reversibility for endpoints that require non-canonical variants. Transformation mappings are maintained across all nodes, and conflict resolution is handled through rules that consider similarity metrics, usage context, or administrative preference. The normalization process is designed to be idempotent, ensuring consistent results regardless of the order in which protocols are processed.

The synchronization orchestrator coordinates multi-phase sync operations that include structure analysis, normalization, conflict resolution, and update propagation. Synchronization state is maintained to ensure atomicity and fault recovery, and rollback is supported when deduplication produces adverse effects. The orchestrator implements back-pressure mechanisms to prevent synchronization storms during periods of high change frequency, smoothing load across the distributed system.

In operation, data flows through the system in coordinated stages that adapt to real-time conditions. An endpoint may initiate communication by transmitting telemetry, which flows through classification and constraint analysis systems. The system retrieves or generates an optimized protocol variant based on the endpoint's capabilities and current network conditions. That variant is stored in an appropriate tier of the cache and deduplicated against existing entries to minimize redundancy. During synchronization, the variant is converted to its canonical form, reducing bandwidth and storage requirements across the distributed cache infrastructure. Throughout this cycle, feedback is collected and used to refine predictive models and operational parameters, creating a continuously improving system.

This architecture enables a responsive, intelligent, and scalable protocol management framework that addresses the challenges of modern heterogeneous networks. Protocol behavior is dynamically adapted based on real-time device and network conditions, ensuring optimal performance for each endpoint type. Redundancy is minimized through structural awareness that recognizes functional equivalence despite syntactic differences. Cache resources are used efficiently through capability-aware tiering that matches protocol variants to device classes. Synchronization is bandwidth-conscious and maintains consistency through intelligent normalization. Together, these features support modern communication networks that include billions of diverse endpoints, each with unique constraints and optimization opportunities, while maintaining the flexibility to evolve with changing technology landscapes.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

The term "bit" refers to the smallest unit of information that can be stored or transmitted. It is in the form of a binary digit (either 0 or 1). In terms of hardware, the bit is represented as an electrical signal that is either off (representing 0) or on (representing 1).

The term "byte" refers to a series of bits exactly eight bits in length.

The term "codebook" refers to a database containing sourceblocks each with a pattern of bits and reference code unique within that library. The terms "library" and "encoding/decoding library" are synonymous with the term codebook.

The terms "compression" and "deflation" as used herein mean the representation of data in a more compact form than the original dataset. Compression and/or deflation may be either "lossless", in which the data can be reconstructed in its original form without any loss of the original data, or "lossy" in which the data can be reconstructed in its original form, but with some loss of the original data.

The terms "compression factor" and "deflation factor" as used herein mean the net reduction in size of the compressed data relative to the original data (e.g., if the new data is 70% of the size of the original, then the deflation/compression factor is 30% or 0.3.)

The terms "compression ratio" and "deflation ratio", and as used herein all mean the size of the original data relative to the size of the compressed data (e.g., if the new data is 70% of the size of the original, then the deflation/compression ratio is 70% or 0.7.)

The term "data" means information in any computer-readable form.

The term "data set" refers to a grouping of data for a particular purpose. One example of a data set might be a word processing file containing text and formatting information.

The term "effective compression" or "effective compression ratio" refers to the additional amount data that can be stored using the method herein described versus conventional data storage methods. Although the method herein described is not data compression, per se, expressing the additional capacity in terms of compression is a useful comparison.

The term "source packet" as used herein means a packet of data received for encoding or decoding. A source packet may be a portion of a data set.

The term "sourceblock" as used herein means a defined number of bits or bytes used as the block size for encoding or decoding. A source packet may be divisible into a number of sourceblocks. As one non-limiting example, a 1 megabyte source packet of data may be encoded using 512 byte sourceblocks. The number of bits in a sourceblock may be dynamically optimized by the system during operation. In one aspect, a sourceblock may be of the same length as the block size used by a particular file system, typically 512 bytes or 4,096 bytes.

The term "codeword" refers to the reference code form in which data is stored or transmitted in an aspect of the system. A codeword consists of a reference code to a sourceblock in the library plus an indication of that sourceblock's location in a particular data set.

The term "endpoint telemetry" as used herein refers to structured data received from a device or endpoint indicating one or more current operational characteristics, such as CPU usage, available RAM, battery level, supported protocols, network interface type, or packet loss rate. Telemetry may be collected through persistent or periodic communication with the device and may reflect both static and dynamic attributes.

The term "device capability profile" as used herein refers to a data structure that aggregates telemetry attributes and classifies a device into one or more capability tiers. This profile may include hardware specifications, operating system characteristics, current resource availability, and network context.

The term "capability tier" as used herein refers to a classification level assigned to an endpoint based on resource constraints, including processing power, memory, energy availability, and network performance. Examples include constrained, standard, and high-performance tiers.

The term "context-aware protocol variant" as used herein refers to a modified version of a base communication protocol that is optimized for a specific device or operational context. Modifications may include message truncation, timeout adjustment, compression level changes, or encoding simplifications, while preserving the protocol's core functional behavior.

The term "protocol appendix" as used herein refers to an auxiliary specification that accompanies a base protocol and defines optional, truncated, or device-specific behaviors that are applicable under constrained conditions. Protocol appendices are generated based on contextual analysis and do not alter core semantics of the protocol.

The term "optimization profile" as used herein refers to a set of parameters or transformation rules generated in response to device constraints, used to create a context-aware protocol variant. The profile may include latency targets, compression thresholds, timeout durations, and data format preferences.

The term "functionally equivalent protocol" as used herein refers to a communication protocol that performs the same operations and maintains the same behavioral semantics as another protocol, despite potential differences in syntax, message encoding, field ordering, or metadata format.

The term "protocol fingerprint" as used herein refers to a representation, such as a hash, vector, or graph structure, derived from the behavioral and structural analysis of a protocol's messages, state transitions, and data transformations, used for identifying functional equivalence among protocols.

The term "canonical protocol form" as used herein refers to a standardized representation of a functionally equivalent group of protocols, used to reduce redundancy in storage and synchronization. Canonical forms are lossless, reversible, and preserve all behavior necessary for functional compliance.

The term "tiered cache" as used herein refers to a cache structure logically divided by device capability profiles, such that each tier stores protocol variants optimized for a corresponding class of endpoint devices.

The term "semantic synchronization" as used herein refers to a synchronization process that includes transformation of protocol variants into canonical forms prior to synchronization and/or reconciliation of variant conflicts based on behavioral similarity, thereby reducing redundant transmission and ensuring logical consistency across distributed systems.

The term "protocol normalization" as used herein refers to the process of transforming different protocol variants into a common canonical structure based on equivalence mappings, used for deduplication, synchronization, and compatibility verification.

The term "predictive model" as used herein refers to a statistical or machine-learned model trained on telemetry, performance metrics, and protocol usage history to forecast communication needs, optimization opportunities, or cache population requirements.

The term "semantic similarity score" as used herein refers to a computed value that quantifies the degree of functional resemblance between two protocols based on structural, behavioral, or statistical features extracted from protocol specifications.

Legacy Adaptive Protocol Cache Optimization System Architecture

The following section describes subject matter carried over from the parent application and is provided for context; for a full disclosure of this material, including additional embodiments and implementations, reference is made to U.S. application Ser. No. 19/044,355, which is incorporated herein by reference in its entirety.

FIG. 1 illustrates one embodiment of the adaptive protocol cache optimization system 100, representing a comprehensive architecture that integrates multiple subsystems to optimize caching, synchronization, and protocol prediction. It will be appreciated by one skilled in the art that various embodiments may be adapted to suit specific use case scenarios, including but not limited to distributed computing environments, high-demand transaction systems, or secure communication networks. The specific configuration and interactions of the subsystems described in this embodiment may vary depending on the operational requirements, resource constraints, and performance goals of the deployment environment. These variations are within the scope of the system, which is designed to be modular and flexible to address diverse implementation needs.

System communication bus 110 forms core infrastructure for connecting major subsystems and components, enabling efficient data exchange and coordination across system 100. Integration controller 140 manages interactions between system 100 and existing network infrastructure, coordinating with a transaction management system and a protocol prediction component to facilitate seamless protocol management.

Cache management system 200 implements multi-level protocol caching through local, regional and global cache hierarchies, storing frequently used protocols while maintaining cache coherency across distributed nodes. Cache synchronization system 300 utilizes Merkle tree structures to enable efficient verification and updating of cache contents across network nodes, minimizing data transfer requirements during synchronization operations.

Performance monitoring system 400 tracks key metrics including cache hit rates, protocol negotiation latency, and resource utilization across cache levels. This monitoring data feeds into pre-fetch prediction system 500, which analyzes usage patterns to anticipate future protocol requirements and trigger proactive cache operations. A machine learning engine enhances prediction capabilities by incorporating pattern recognition and machine learning techniques.

External network interface 120 manages communication between distributed cache system components and enables integration with protocol repositories. System configuration manager 130 provides centralized control over cache system behavior, allowing administrators to tune performance parameters and optimization strategies. Security gateway 150 ensures cache operations comply with network security policies while protecting cached protocol data.

Integration with a protocol generation system enables compression of cached protocols using existing codebooks, reducing storage requirements while maintaining rapid access capabilities. A protocol translation component interfaces with cache management system 200 to store and retrieve common translation patterns, reducing computational overhead of repeated translation operations.

Cache management system 200 maintains detailed protocol cache entries containing descriptors, performance metrics, and usage statistics. When protocol requests arrive through a transaction management system, cache lookups occur before engaging a protocol prediction component. Success rates and performance data flow back through performance monitoring system 400 to continuously optimize cache operations.

Pre-fetch prediction system 500 coordinates with a protocol prediction component and A machine learning engine to identify protocols likely to be needed, triggering cache warming operations through cache management system 200. Protocol translation patterns from a protocol translation component inform caching decisions for commonly used protocol conversions.

System communication bus 110 enables coordinated operation of all subsystems while maintaining separation of concerns. Integration controller 140 manages data flow between cache optimization system 100 and external components through standardized interfaces. This architecture allows system 100 to enhance protocol management capabilities while maintaining compatibility with existing network infrastructure.

When a transaction management system initiates protocol requests, integration controller 140 receives them via system communication bus 110 and routes them to cache management system 200 for initial cache lookup. Upon cache hit, cache management system 200 returns cached protocols directly through system communication bus 110 to integration controller 140. During cache misses, integration controller 140 forwards requests to a protocol prediction component, while simultaneously triggering pre-fetch prediction system 500 to update predictive models. Performance monitoring system 400 collects metrics on cache operations and feeds this data through system communication bus 110 to A machine learning engine and system configuration manager 130 for optimization. When new protocols or translations are identified by a protocol translation component, they flow through integration controller 140 to cache management system 200 for storage. Cache synchronization system 300 continuously monitors cache states across distributed nodes through external network interface 120, initiating synchronization operations when inconsistencies are detected. Security gateway 150 validates all data flows across system communication bus 110, ensuring protocol cache operations maintain security compliance. A protocol generation system provides compression codebooks to cache management system 200 through system communication bus 110, enabling efficient storage of cached protocols while maintaining rapid access capabilities.

Figure 2:
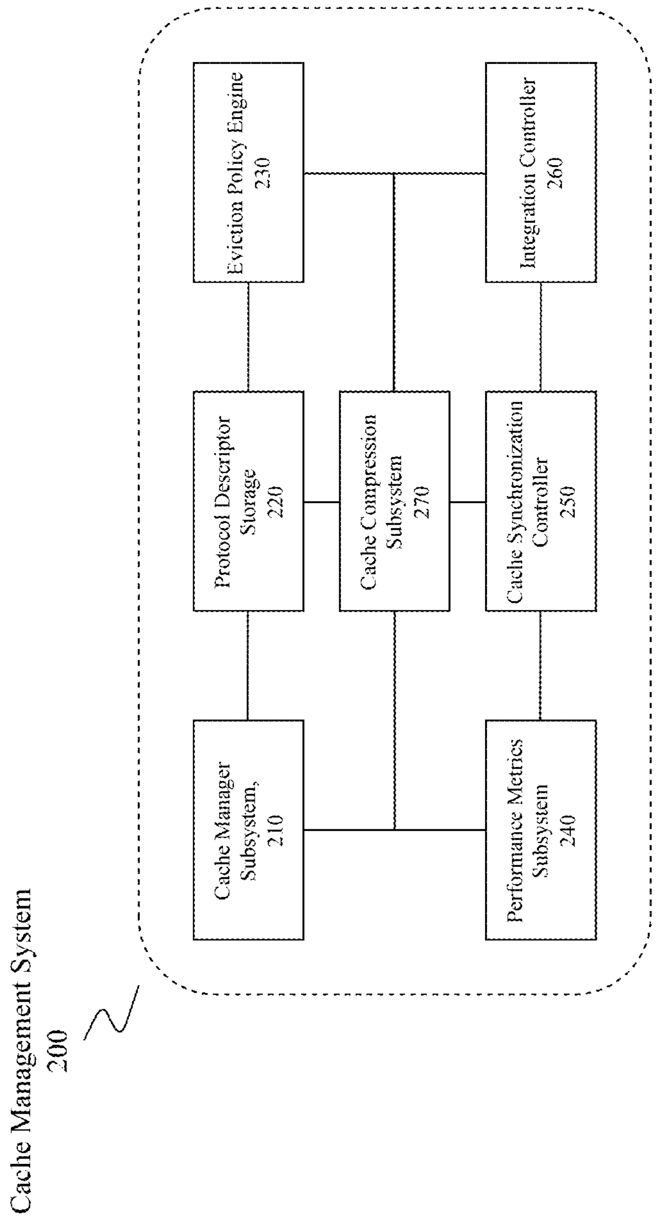
FIG. 2 is a block diagram illustrating exemplary architecture of cache management system.

FIG. 2 is a block diagram illustrating an embodiment of cache management system 200. Cache management system 200 stores, retrieves, and updates protocol cache entries across distributed environments. It comprises coordinated subsystems that manage cache entry lifecycles, enforce eviction policies, and interface with external components.

Cache manager subsystem 210 serves as the control unit, handling creation, update, and retirement of cache entries. It manages dependencies, assigns entry priorities, and interfaces with a protocol predictor to pre-fetch anticipated entries based on usage trends or network conditions.

Protocol descriptor storage subsystem 220 maintains protocol metadata including identifiers, versions, and configuration parameters. Descriptors may be compressed using delta encoding or pooled structures to reduce redundancy and improve lookup efficiency.

Eviction policy engine 230 identifies entries for removal when resource thresholds are reached. Eviction decisions are based on access frequency, success rate, and entry age, and may be tuned dynamically. Synchronization with peer nodes ensures consistent eviction across the distributed cache.

Performance metrics subsystem 240 monitors indicators such as cache hit rate and negotiation latency. Metrics drive real-time adjustments to pre-fetching or eviction strategies and may be aggregated system-wide for optimization and diagnostics.

Synchronization controller subsystem 250 manages propagation of cache updates across nodes. Merkle trees may be used to identify differences and enable compact, differential synchronization. Update priority may be based on cache tier or network state.

Integration controller 260 coordinates with external systems (e.g., transaction managers or protocol translators), supplying cached entries when available and bypassing prediction components on hits. It also manages bidirectional feedback and external configuration updates.

Cache compression subsystem 270 reduces storage overhead by encoding protocol entries with codebooks and applying delta compression. Compression strategies may adapt based on access latency requirements or resource conditions.

Machine learning may be used to guide cache operations including prediction, eviction, compression, and synchronization. Models may be supervised, unsupervised, or reinforcement-based and trained on operational data including protocol usage, latency, and network context.

Models are trained and validated using historical transaction logs and may be continuously refined using real-time feedback. Feature engineering and cross-validation may be employed to improve accuracy and generalizability. Transfer learning may be used where applicable.

Machine learning models may dynamically adjust operational thresholds or pre-fetching strategies in response to observed cache behavior. Incremental learning allows the models to evolve over time to reflect changing usage patterns or environments.

To ensure robustness, training datasets may include data from heterogeneous environments or include synthetic examples to capture rare conditions.

In operation, protocol requests are received by cache manager 210, which attempts to serve them from protocol descriptor storage 220. If not found, the system initiates pre-fetching. New or modified entries trigger updates to eviction and synchronization components, with metrics monitored continuously for performance tuning.

Through modular integration, cache management system 200 supports scalable, adaptive protocol handling across distributed nodes while maintaining compatibility with external infrastructure.

Figure 3:
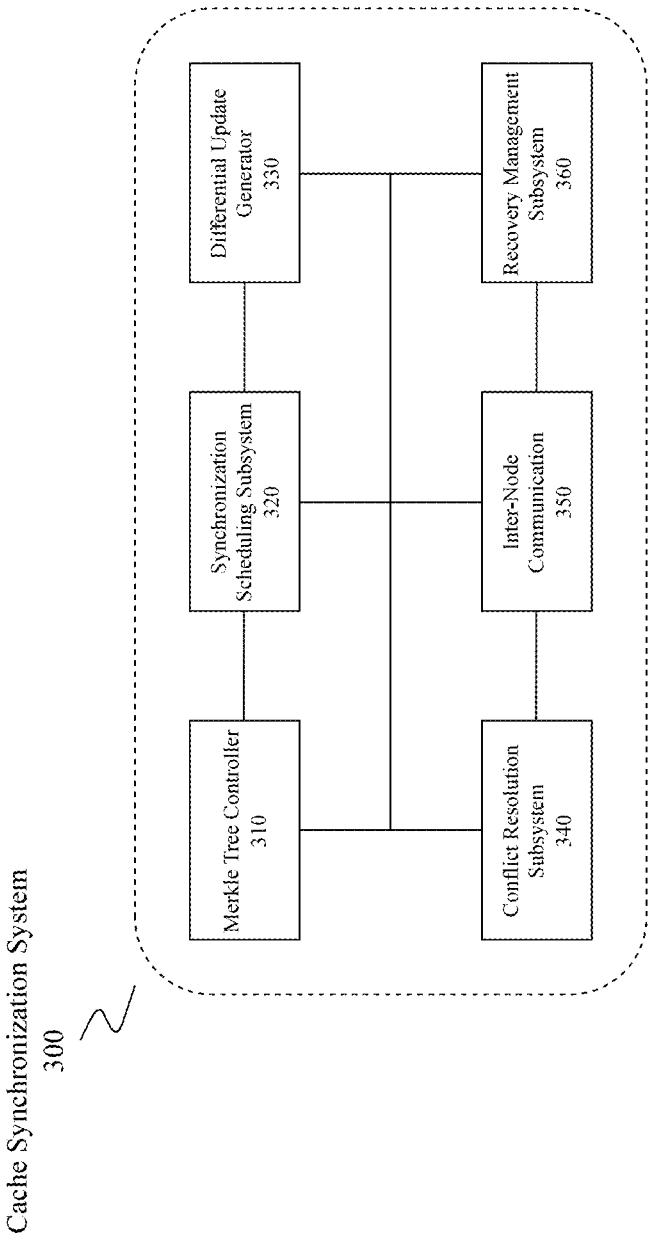
FIG. 3 is a block diagram illustrating exemplary architecture of cache synchronization system.

FIG. 3 is a block diagram illustrating an embodiment of cache synchronization system 300, which ensures consistency of cache contents across distributed nodes while minimizing resource usage. The system includes subsystems that detect changes, propagate updates, resolve conflicts, and manage failure recovery.

Merkle tree controller 310 organizes cache entries into a hierarchical structure for local, regional, and global caches. It generates hashes for each entry—including metadata such as version, identifier, and configuration—enabling change detection without full cache traversal. When differences are found, it notifies synchronization scheduling subsystem 320.

Synchronization scheduling subsystem 320 manages the timing and priority of synchronization tasks based on metrics such as node load, bandwidth availability, and protocol importance. It may batch or defer lower-priority updates and adjust intervals dynamically in response to network conditions. Scheduling directives are passed to differential update generator 330.

Differential update generator 330 creates compact update packages containing only modified entries, informed by hash comparisons from Merkle tree controller 310. These updates may include changes to protocol descriptors, usage statistics, or metrics. The subsystem coordinates with conflict resolution 340 to ensure consistency before transmission.

Conflict resolution subsystem 340 applies strategies such as timestamp or vector clock-based versioning to resolve inconsistencies. It may use rule-based reconciliation or manual override and interfaces with performance monitoring to evaluate the impact of resolution actions.

Inter-node communication subsystem 350 manages discovery, connection setup, and data transfer between nodes. It verifies availability through health checks and prioritizes communication based on topology and load, optimizing synchronization efficiency.

Recovery management subsystem 360 detects synchronization failures—such as timeouts or unresponsive nodes—and triggers corrective actions. These may include incremental syncs or failover to redundant nodes. Restored entries are verified using Merkle hashes to ensure data integrity before reintroduction.

Cache synchronization system 300 interfaces with other system components. Merkle tree controller 310 may retrieve protocol data from cache manager 210. Differential update generator 330 may exclude evicted entries in coordination with eviction logic. Metrics from synchronization scheduling 320 may be shared with system-wide monitoring. Inter-node communication 350 may coordinate external synchronization tasks.

Machine learning models may be used for prioritization, conflict resolution, and recovery. Models may be trained on synchronization logs, bandwidth usage, and system state data using supervised, unsupervised, or reinforcement learning. Features may include latency, resource consumption, and node type.

Training may involve preprocessing, cross-validation, and hyperparameter tuning, with incremental updates or full retraining as conditions evolve. Synthetic data may be used to model rare events. Trained models can be deployed across subsystems to guide real-time decisions and continuously adapt to network behavior.

Data flow begins with hash generation by Merkle tree controller 310. When changes are detected, synchronization scheduling subsystem 320 sets update priorities. Differential update generator 330 isolates changes and prepares compact updates. Inter-node communication 350 transmits updates while ensuring connection health. Conflict resolution 340 reconciles discrepancies, and recovery subsystem 360 handles failures and validates restored entries. These components operate cohesively to maintain synchronized, efficient, and resilient cache states across the system.

Figure 4:
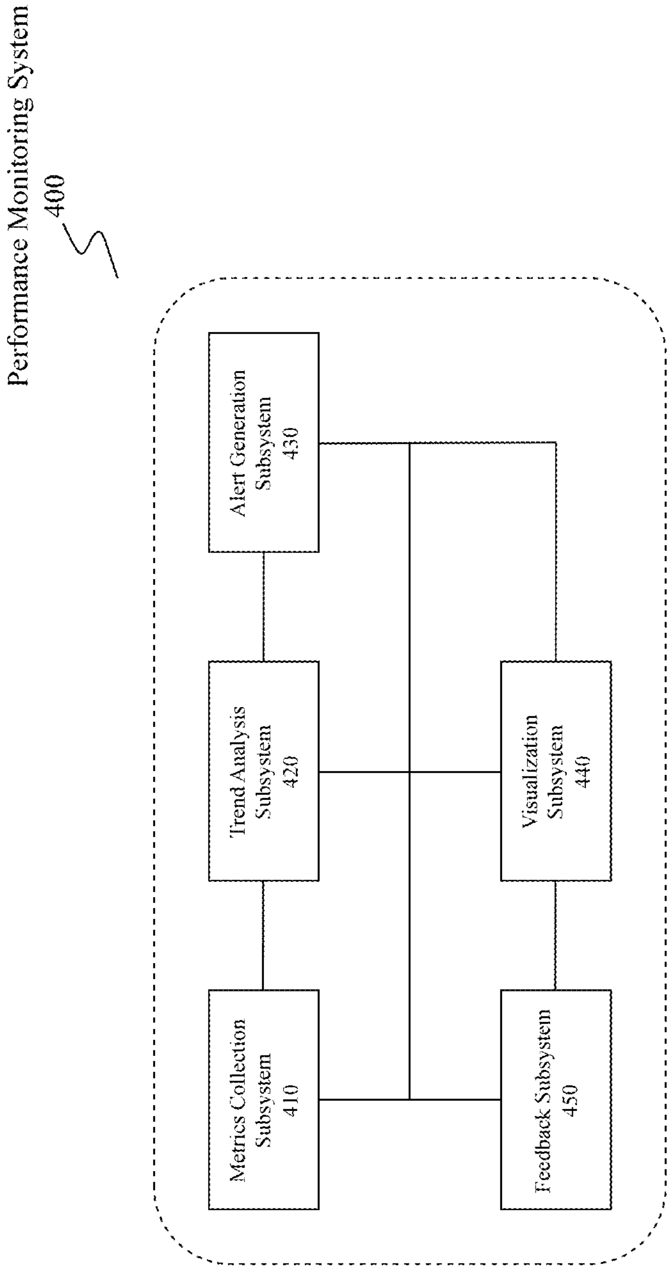
FIG. 4 is a block diagram illustrating exemplary architecture of performance monitoring system.

FIG. 4 is a block diagram illustrating an embodiment of performance monitoring system 400. The system collects, analyzes, and disseminates metrics from across the adaptive protocol caching framework to support optimization, anomaly detection, and coordinated system adjustments.

Metrics collection subsystem 410 gathers performance data from components such as cache management system 200, cache synchronization system 300, and external systems. Collected metrics may include cache hit rates, latency, bandwidth usage, and resource consumption. The subsystem may use polling, triggers, or streaming to retrieve data efficiently, applying filters to eliminate redundant or outdated inputs.

Trend analysis subsystem 420 processes collected metrics to identify performance patterns, anomalies, and long-term trends. This may involve statistical methods or machine learning techniques such as clustering and anomaly detection. Results can inform adjustments to caching, synchronization timing, or resource allocation, and may be shared with other subsystems to optimize load balancing and operational planning.

Alert generation subsystem 430 evaluates metrics against thresholds to detect failures or performance degradation. Alerts may include causes and corrective actions and may trigger recovery workflows or be escalated to administrators. The subsystem may coordinate with other components to reroute requests, adjust parameters, or initiate preemptive actions in response to observed conditions.

Feedback subsystem 440 routes performance insights to other components for dynamic adjustment. For example, it may inform cache compression strategies, pre-fetch policies, or protocol prediction parameters. The subsystem also supports training pipelines for machine learning models by supplying historical and real-time performance data.

Visualization subsystem 450 generates dashboards, charts, and reports from processed data. These visualizations enable administrators to monitor real-time trends, compare current performance against historical baselines, and identify bottlenecks. Insights may also be shared with external consoles or monitoring tools for broader operational visibility.

Machine learning models may enhance performance monitoring system 400 by predicting cache usage, identifying risk conditions, and recommending optimization strategies. These models may be supervised, unsupervised, or reinforcement-based and trained using data such as latency, node load, synchronization metrics, and topology context.

Model training involves standard preprocessing steps such as normalization, feature encoding, and segmentation of datasets for training and validation. Synthetic data may be used to capture rare or extreme events. Model optimization may include hyperparameter tuning, cross-validation, or transfer learning from pre-trained models.

Trained models operate in real time, providing predictive insights or triggering actions such as dynamic reallocation of bandwidth or adjustment of synchronization intervals. They may be updated incrementally to reflect system evolution and remain responsive to changing patterns.

During operation, data flows from metrics collection to trend analysis, which detects key patterns and anomalies. Alerts are generated as needed, while feedback is disseminated to relevant subsystems to trigger optimizations. Visualization tools render the processed insights for administrative review. The system's feedback loops enable continuous monitoring, adjustment, and performance improvement across the protocol caching framework.

Figure 5:
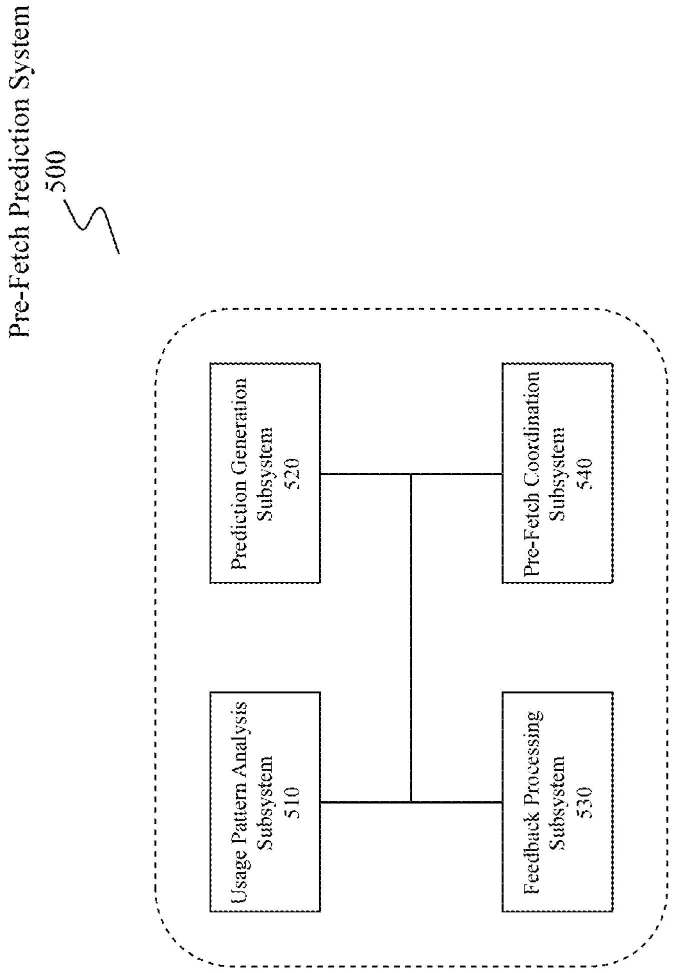
FIG. 5 is a block diagram illustrating exemplary architecture of pre-fetch prediction system.

FIG. 5 is a block diagram illustrating an embodiment of pre-fetch prediction system 500. The system anticipates future protocol requirements and proactively optimizes cache population across distributed nodes to reduce latency and improve performance.

Usage pattern analysis subsystem 510 collects historical and real-time data related to protocol access. It identifies trends such as time-based access spikes, geographic clustering, or protocol-type correlations. Data is structured into formats such as time-series profiles or usage heatmaps to support downstream prediction.

Prediction generation subsystem 520 analyzes usage patterns to forecast protocol demand. It may apply supervised learning models trained on prior access conditions or reinforcement learning models that adapt based on real-time feedback. Generated predictions are forwarded to cache manager subsystem 210 for early placement of anticipated protocols at appropriate cache levels.

Feedback processing subsystem 530 evaluates the outcomes of pre-fetch operations by monitoring metrics such as cache hit/miss rates and resource utilization. Discrepancies between predictions and actual demand are used to refine model inputs, enabling continuous learning. Feedback may also be shared with broader system components to coordinate adaptive strategies.

Pre-fetch coordination subsystem 540 translates protocol predictions into executable pre-fetch instructions. It prioritizes actions based on factors such as protocol importance, available bandwidth, and system load. It also ensures pre-fetched protocols are properly synchronized across distributed nodes and avoids redundant fetch operations.

Machine learning models used within the system may include supervised algorithms (e.g., decision trees, neural networks), clustering techniques, or reinforcement frameworks. These models are trained on access logs and system telemetry, including attributes like protocol type, frequency, time of access, and network conditions.

Training includes feature normalization, categorical encoding, time-series extraction, and dataset segmentation. Synthetic data may be introduced to model rare demand shifts or unexpected traffic surges. Models may be optimized using hyperparameter tuning and validated with cross-validation. Transfer learning may be employed to adapt models trained on related protocol or cache behaviors.

Once deployed, models operate in real time, continuously refining their forecasts as updated data becomes available. Feedback loops between usage pattern analysis and feedback processing support incremental learning and dynamic adjustment of pre-fetch strategies. This ensures the system adapts to evolving usage trends and network conditions.

During operation, usage pattern analysis subsystem 510 collects and processes demand data, which is analyzed by prediction generation subsystem 520 to identify protocols likely to be accessed. These predictions are prioritized and distributed by pre-fetch coordination subsystem 540 to the cache manager and synchronization components. Feedback processing subsystem 530 monitors pre-fetch outcomes and informs iterative model improvement. Together, these components ensure that pre-fetch prediction system 500 dynamically aligns protocol placement with anticipated demand, improving responsiveness and cache efficiency across the distributed environment.

Adaptive Protocol Cache System Architecture

Figure 6:
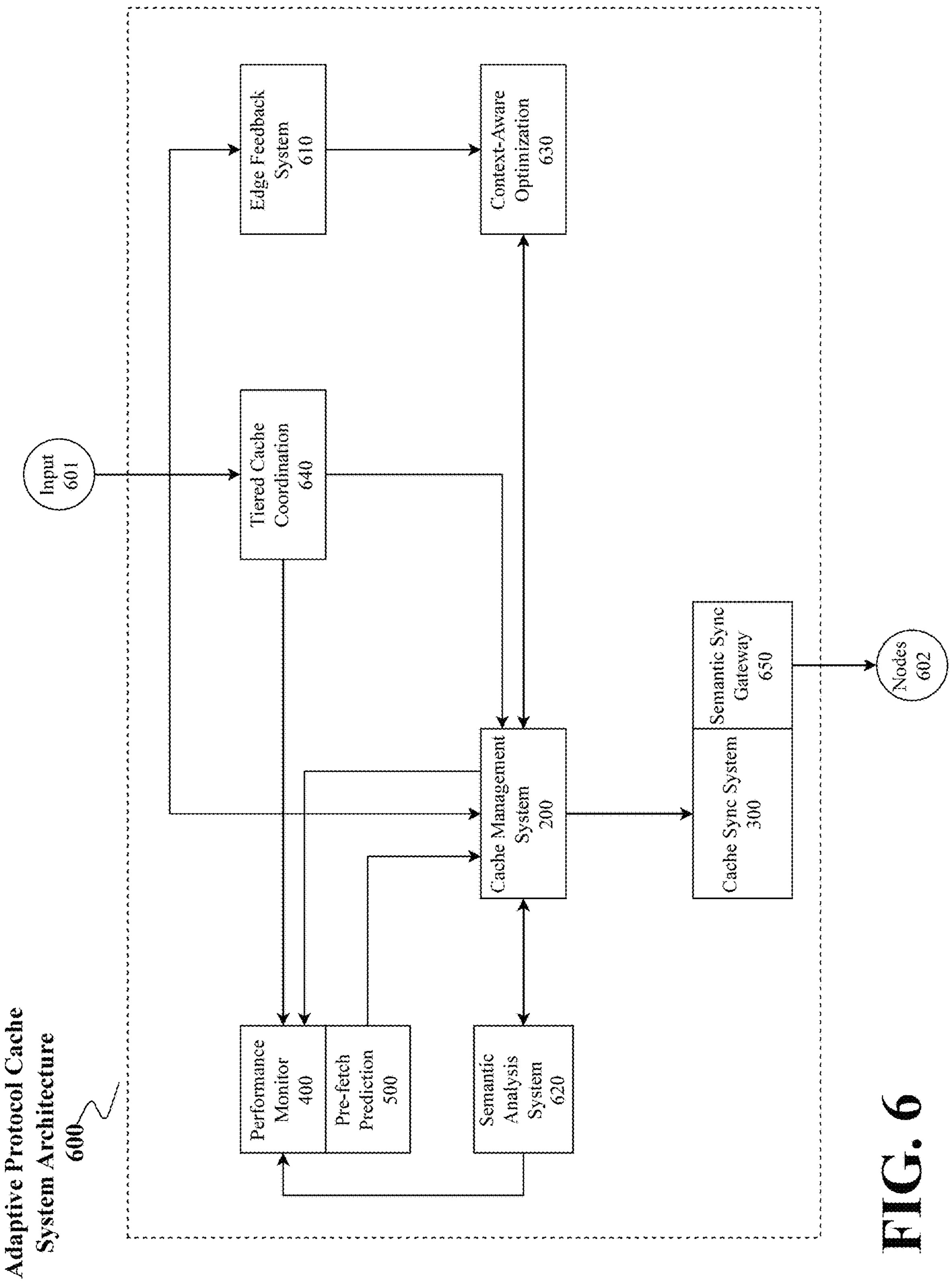
FIG. 6 is a block diagram illustrating an adaptive protocol cache system architecture, including multiple interconnected subsystems configured to collect edge condition feedback, perform semantic analysis, optimize protocol variants, coordinate tiered cache operations, and enhance synchronization through semantic processing.

FIG. 6 is a block diagram illustrating exemplary architecture of adaptive protocol cache system 600, in an embodiment. Adaptive protocol cache system 600 enhances communication efficiency across heterogeneous network environments through coordinated operation of multiple subsystems that collect endpoint telemetry, perform semantic protocol analysis, generate context-aware optimizations, manage tiered caching, and enable intelligent synchronization.

Edge condition feedback system 610 collects telemetry data 601 from endpoints including IoT devices, mobile devices, servers, and workstations. An endpoint telemetry collector within system 610 receives device capability reports containing CPU class, available RAM, power state, network interface types, and supported protocol versions. A device classification engine processes this telemetry to categorize endpoints into capability tiers such as high-performance servers, standard workstations, constrained IoT devices, and mobile devices. A constraint analysis subsystem evaluates device limitations against protocol requirements to identify optimization opportunities. A feedback aggregation service consolidates telemetry from multiple endpoints across geographic regions and network segments, while an edge analytics engine performs pattern analysis to detect trends and anomalies in endpoint behavior.

Context-aware protocol optimization system 630 receives constraint data from edge condition feedback system 610 and generates protocol variants tailored to specific device capabilities. A context-aware optimizer interfaces with cache management system 200 to request base protocol specifications, then coordinates with an endpoint protocol adapter to create device-specific variants. These variants maintain compatibility with base protocols while implementing optimizations such as field truncation, adjusted timeout values, and appropriate compression levels based on device constraints. A protocol variant manager tracks generated variants with metadata including creation context, optimization parameters, and usage statistics.

Semantic protocol analysis system 620 receives protocol entries from cache management system 200 and performs deduplication based on functional equivalence rather than syntactic matching. A feature extraction subsystem transforms protocol definitions into multi-dimensional feature vectors representing communication patterns, data types, and operational parameters. A protocol equivalence engine compares these features to identify functionally identical protocols despite differences in encoding, field ordering, or metadata representation. A canonical form generator creates standardized representations for equivalent protocols, maintaining bidirectional mappings to support reversibility. A deduplication controller orchestrates consolidation of redundant entries and coordinates with cache management system 200 to update stored protocols. A semantic index manager maintains searchable indices of protocol relationships and equivalence groups.

Tiered cache coordination system 640 manages device-class-aware caching by interfacing with cache management system 200 through a non-invasive overlay architecture. A tier classification service receives protocol requests 601 from endpoints and categorizes them based on device capabilities. A cross-tier coordinator routes these requests to cache management system 200 with tier-specific parameters that influence cache operations without modifying base functionality. A constraint-based policy manager provides recommendations for retention priorities and eviction strategies based on device-specific resource limitations. A tier performance monitor tracks metrics for each tier and feeds data to performance monitoring system 400. A tier migration controller manages movement of protocols between tiers based on usage patterns and device population changes.

Semantic synchronization gateway 650 enhances cache synchronization system 300 with semantic capabilities through transparent interception of synchronization operations. A semantic preprocessor intercepts sync data flowing between cache management system 300 and distributed nodes 602, applying normalization before transmission. A protocol normalization service converts protocol variants to canonical forms to reduce redundancy during synchronization. A variant resolution engine handles conflicts between functionally equivalent protocols using similarity scoring and precedence rules. A semantic sync orchestrator coordinates multi-phase synchronization operations while maintaining compatibility with existing Merkle tree structures used by system 300.

Performance monitoring system 400 collects metrics from multiple sources including cache management system 200, tiered cache coordination system 640, and semantic protocol analysis system 620. These metrics include cache hit rates, deduplication statistics, tier performance indicators, and synchronization efficiency measures. Analyzed metrics flow to pre-fetch prediction system 500, which generates anticipatory cache population commands sent to cache management system 200.

During operation, endpoints transmit telemetry to edge condition feedback system 610 while simultaneously making protocol requests through tiered cache coordination system 640. Edge feedback flows through constraint analysis and aggregation to identify device-specific optimization needs. This constraint data drives context-aware protocol optimization system 630 to generate tailored protocol variants stored in cache management system 200. Cached protocols undergo semantic analysis in system 620 for deduplication, reducing storage requirements and improving efficiency. When distributed synchronization occurs, semantic synchronization gateway 650 intercepts and enhances sync operations with normalization processing. Throughout these operations, performance monitoring system 400 tracks system behavior and enables predictive optimization through system 500, creating a continuously adapting protocol cache architecture that responds to diverse endpoint requirements while maintaining compatibility with existing infrastructure.

Figure 7:
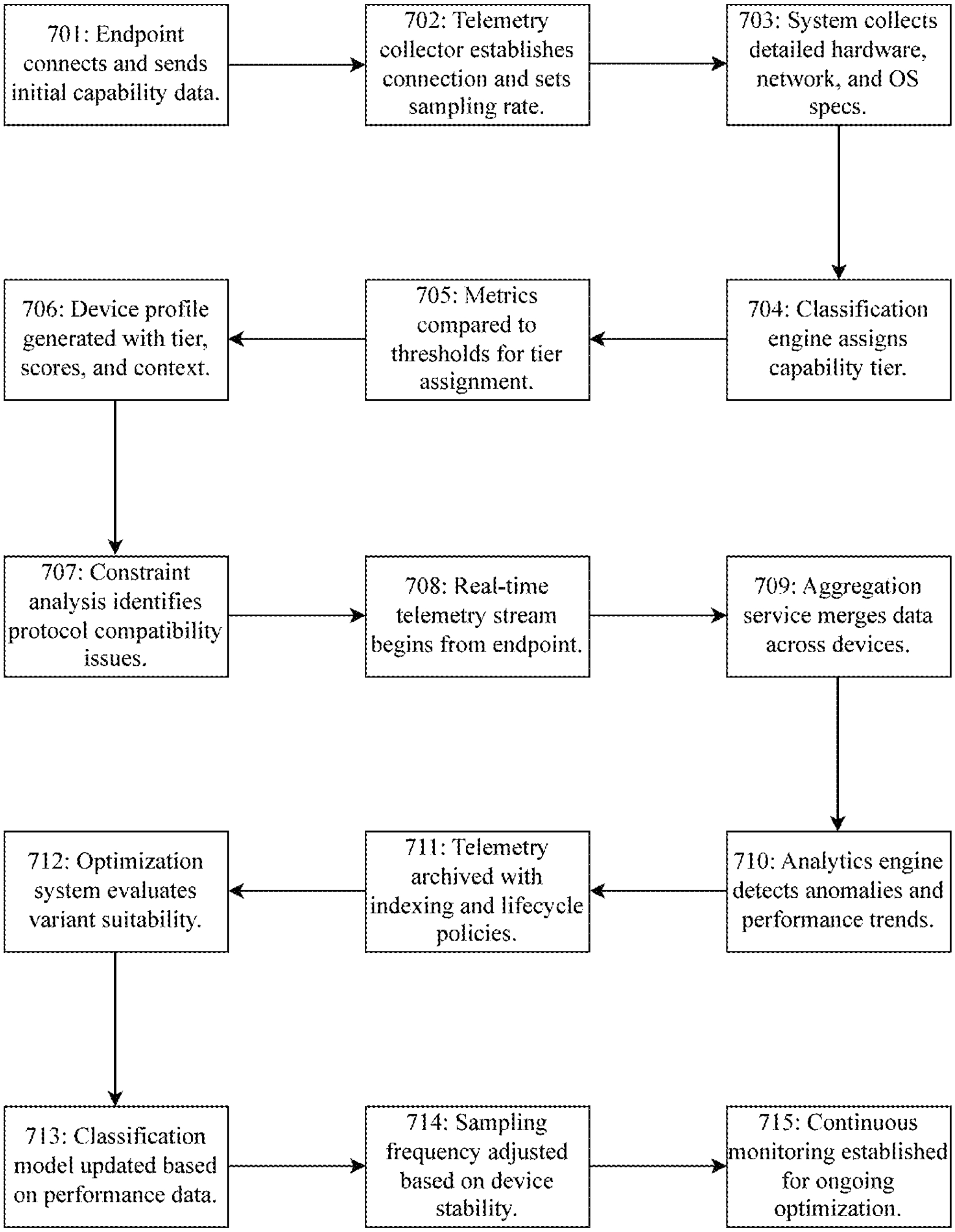
FIG. 7 is a flow diagram depicting the operation of an edge condition feedback system, including telemetry collection from endpoint devices, device classification into capability tiers, constraint analysis, and aggregation of feedback data for downstream optimization.

FIG. 7 is a flow diagram illustrating exemplary endpoint telemetry collection and device classification of adaptive protocol cache system 600, in an embodiment.

The process begins when an endpoint device initiates connection to the network and transmits initial capability information to edge condition feedback system 610, including device type identifier, hardware specifications, and supported protocol versions 701. The endpoint telemetry collector within system 610 receives this telemetry and establishes a persistent connection with the endpoint for continuous monitoring, configuring adaptive sampling rates based on the endpoint's reported capabilities and network conditions 702.

The telemetry collector performs detailed capability assessment by requesting an expanded device profile. This includes CPU architecture and available cycles or clock frequency, RAM size and current utilization, storage characteristics such as type and available capacity, network interface specifications including supported speeds and protocols, power source information indicating whether the device is battery-powered or connected to continuous power, and operating system version and supported features 703. The device classification engine within system 610 processes this data through multi-dimensional analysis that evaluates hardware, software, and operational attributes to assign the device to a capability tier 704.

Classification involves comparing device metrics to predefined thresholds within the device classification engine of edge condition feedback system 610. High-performance servers may be characterized by multi-core CPUs, over 32 GB of RAM, and gigabit or faster network interfaces. Standard workstations typically have moderate processing power, 8-32 GB of RAM, and wired Ethernet connectivity. Constrained IoT devices often operate with sub-gigahertz processors, less than 1 GB of memory, and low-power wireless links. Mobile devices are distinguished by battery operation, power-aware hardware, and variable network access 705.

The device classification engine of system 610 then generates a complete device profile, including the assigned tier classification, capability scores across resource categories, operational context indicators, and historical performance records, if available 706.

The constraint analysis subsystem within edge condition feedback system 610 evaluates this profile against protocol configurations currently managed in cache management system 200. It identifies potential mismatches such as memory limitations that prevent full protocol instantiation, insufficient processing capacity that may cause timeout violations, or bandwidth constraints that trigger the need for compressed variants 707.

Real-time performance monitoring is initiated by the endpoint telemetry collector in system 610, which streams operational metrics including packet loss, protocol-level latency, resource consumption, fallback events, and network quality indicators like jitter and bandwidth availability 708.

The feedback aggregation service of system 610 consolidates telemetry from the current endpoint with data from other devices in the same geographic area or logical network segment. Statistical analysis is applied to uncover shared constraint patterns and localized performance characteristics 709.

The edge analytics engine within system 610 processes aggregated telemetry using pattern recognition to detect anomalies, correlate endpoint constraints with protocol outcomes, and identify trends in device capabilities that may require adjustment of protocol variant distribution across cache tiers 710.

The telemetry storage manager, also part of edge condition feedback system 610, archives the processed data using an indexed structure to support fast retrieval. Data lifecycle policies are enforced, with recent data retained in uncompressed form for real-time use and older data compressed for long-term storage 711.

The classification results and constraint analysis output from system 610 are transmitted to context-aware protocol optimization system 630. This system evaluates whether existing protocol variants stored in cache management system 200 meet the endpoint's constraints or whether new variants need to be generated 712.

The device classification engine of system 610 updates its internal models based on observed performance data, implementing continuous learning mechanisms that refine tier thresholds and resource weighting to improve classification accuracy over time 713. Concurrently, the telemetry collector adjusts its sampling strategy according to device stability, lowering telemetry overhead for stable endpoints and increasing sampling for those showing variable performance or nearing operational limits 714.

The process concludes as edge condition feedback system 610 transitions to continuous monitoring, supplying real-time data to other subsystems within adaptive protocol cache system 600 to support ongoing optimization and device-specific protocol adaptation 715.

Figure 8:
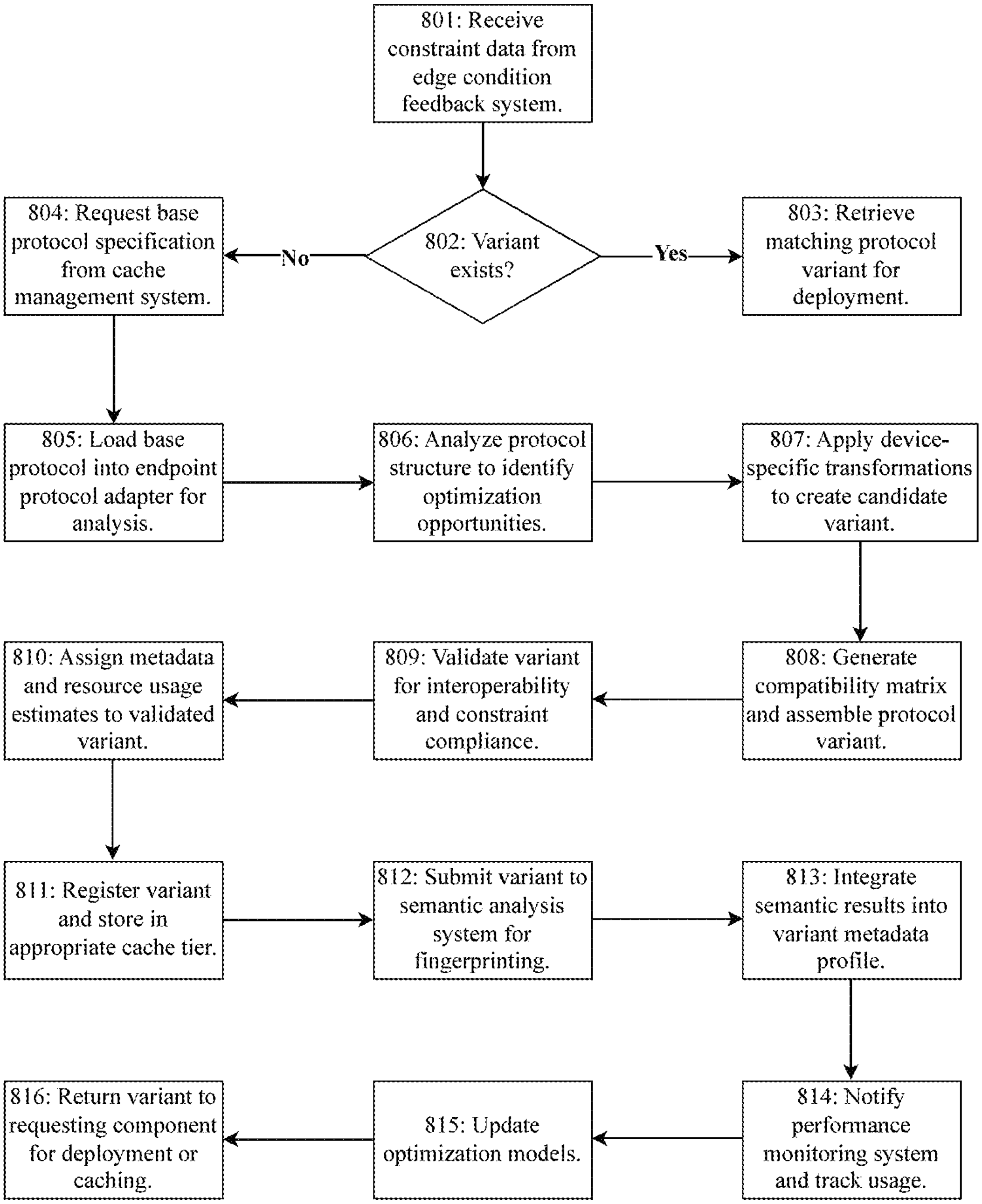
FIG. 8 is a flow diagram illustrating context-aware protocol variant generation, wherein constraint data is processed to generate device-specific protocol variants using a context-aware optimization engine and protocol adaptation logic.

FIG. 8 is a flow diagram illustrating exemplary context-aware protocol variant generation of context-aware hash function compression system 800, in an embodiment.

The process begins when context-aware protocol optimization system 630 receives constraint data from edge condition feedback system 610, including device classification information, resource limitations, and operational parameters that characterize the requesting endpoint's capabilities and current operating environment 801. The context-aware optimizer within system 630 evaluates the received constraint data against existing protocol variant mappings stored in protocol variant manager to determine whether a suitable optimized variant already exists for the specific combination of device tier, resource constraints, and operational context 802. If a variant match exists, the protocol variant is retrieved from a variant manager for deployment 803.

Upon determining that no existing variant matches the current requirements, the context-aware optimizer interfaces with cache management system 200 through integration controller 140 to request the base protocol specification, including complete message structures, state machine definitions, timeout parameters, and encoding specifications necessary for variant generation 804. The system retrieves the base protocol from protocol descriptor storage subsystem 220 and transmits it back to context-aware protocol optimization system 630, where it is loaded into the endpoint protocol adapter for analysis and transformation processing 805.

The endpoint protocol adapter within system 630 initiates a multi-phase analysis of the base protocol structure, examining message field utilization patterns, identifying mandatory versus optional fields, evaluating data type precision requirements, and assessing state transition complexity to determine optimization opportunities that maintain functional compatibility while reducing resource demands 806. Based on this analysis and the specific constraints identified for the requesting endpoint, the adapter applies a series of transformations including field truncation for non-critical data elements, precision reduction for numeric values where full precision exceeds device capabilities, timeout value adjustments to accommodate slower processing speeds or higher latency networks, and compression algorithm selection matched to available processing power and memory constraints 807.

The system generates a candidate protocol variant incorporating all applied optimizations and creates a compatibility matrix that maps each transformation to its impact on protocol behavior, ensuring that core message semantics and state machine logic remain intact despite the modifications 808. The generated variant undergoes validation testing within system 630 using a protocol verification engine that simulates message exchanges between the optimized variant and the base protocol to confirm interoperability, verifies that all mandatory protocol behaviors are preserved, and checks that resource consumption falls within the constraints specified by the requesting endpoint's profile 809.

Following successful validation, protocol variant manager assigns metadata to the new variant including creation timestamp, source constraint profile that triggered generation, optimization parameters applied, compatibility score relative to the base protocol, and expected resource consumption metrics based on the transformations applied 810. The variant manager stores the new protocol variant in its internal registry and coordinates with cache management system 200 to place the variant in the appropriate tier of the multi-level cache structure, selecting the tier based on the device classification and ensuring the variant is available for future requests from similar endpoints 811.

System 630 then interfaces with semantic protocol analysis system 620 to submit the newly generated variant for semantic fingerprinting, enabling future deduplication operations to recognize if functionally equivalent variants are subsequently generated for other device profiles with similar constraints 812. The semantic analysis results are incorporated into the variant's metadata profile, creating a comprehensive record that includes both the variant's operational characteristics and its semantic relationships to other protocols in the cache ecosystem 813.

Performance monitoring system 400 is notified of the new variant creation and begins tracking its usage patterns, resource consumption metrics, and success rates in actual endpoint communications to build a performance profile that will inform future optimization decisions 814. The context-aware optimizer updates its internal optimization models based on the successful variant generation, incorporating lessons learned about effective transformation strategies for the specific combination of device constraints and protocol characteristics encountered 815.

Finally, context-aware protocol optimization system 630 returns the optimized protocol variant to the requesting system component, whether that be tiered cache coordination system 640 responding to an endpoint request or pre-fetch prediction system 500 proactively populating cache tiers, completing the variant generation cycle 816. The optimized protocol enables efficient communication tailored to the endpoint's capabilities.

Figure 9:
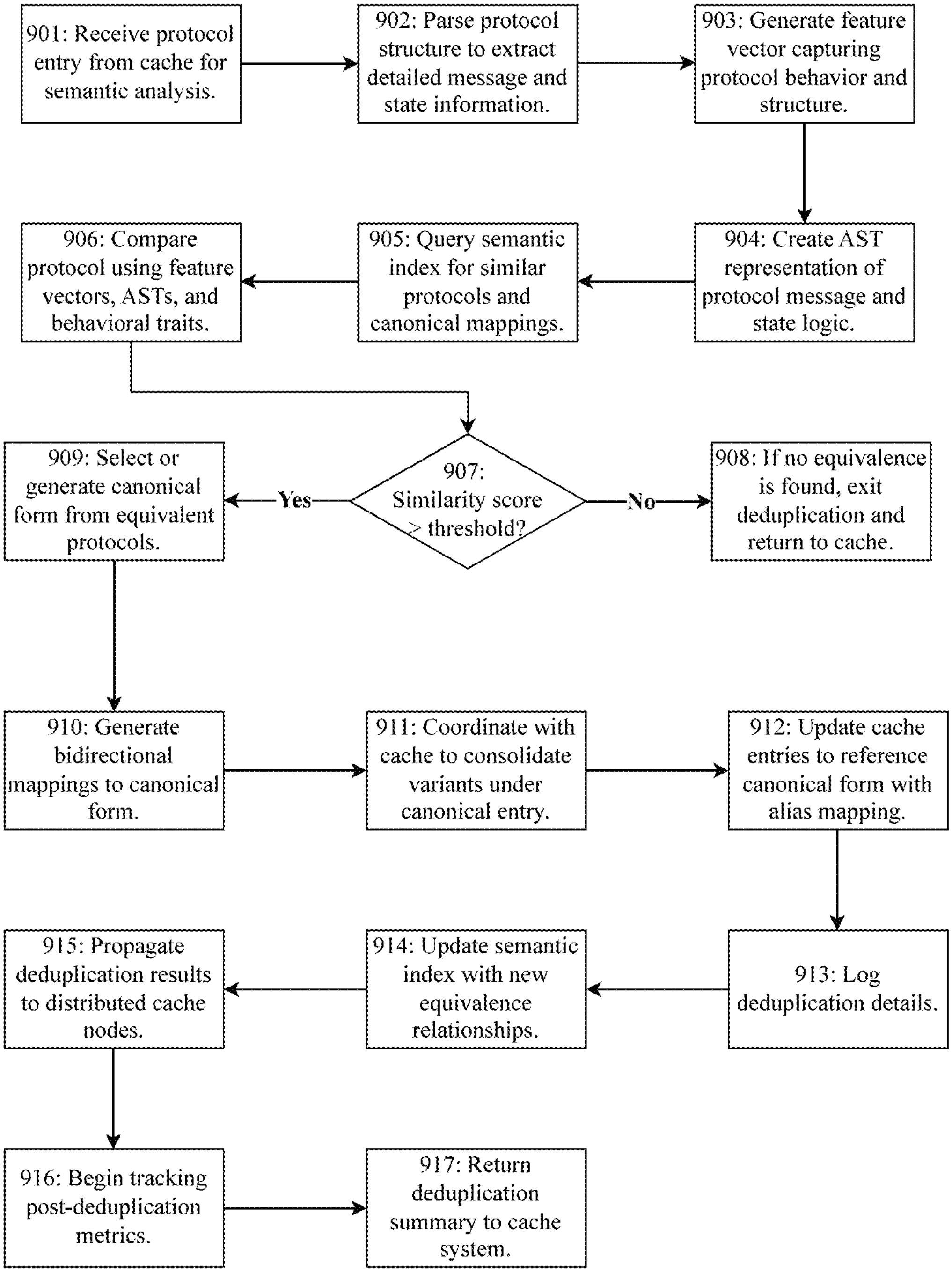
FIG. 9 is a flow diagram showing semantic protocol deduplication, including feature extraction, equivalence detection, canonical form generation, and the consolidation of redundant protocol entries for storage and synchronization efficiency.

FIG. 9 is a flow diagram illustrating exemplary semantic protocol deduplication flow of adaptive protocol cache system 600, in an embodiment.

The process initiates when semantic protocol analysis system 620 receives a protocol entry from cache management system 200. The trigger may be the addition of a new protocol, generation of a protocol variant by system 630, or a scheduled deduplication scan across existing cache contents 901.

The feature extraction subsystem within system 620 parses the protocol's structure, including message definitions, field specifications, data types, encoding formats, state transitions, and timing parameters, to construct a detailed structural model 902.

Next, the subsystem generates a multi-dimensional feature vector that represents key behavioral and structural elements such as message sequences, field order, error handling mechanisms, and protocol negotiation flows. This mathematical representation abstracts away surface-level formatting to isolate functional behavior 903.

An abstract syntax tree (AST) is also created, representing the message and state machine structure. Names and metadata are normalized to emphasize invariant logic and remove implementation-specific differences 904.

The protocol equivalence engine receives the feature vector and AST. It queries the semantic index manager for candidate protocols with similar characteristics and retrieves their canonical mappings and feature vectors for comparison 905.

The engine performs similarity evaluation using vector distance metrics, AST structure matching, and comparison of behavioral characteristics like acknowledgment handling, retry behavior, and session lifecycle control 906.

If the similarity score exceeds configured thresholds, the system marks the protocol as a deduplication candidate. Further validation is conducted to confirm behavioral equivalence under edge-case scenarios and varied conditions 907.

If the protocols are determined not to be functionally equivalent, the semantic protocol analysis system 620 terminates the deduplication flow for the current entry and returns control to cache management system 200 without modification 908.

The canonical form generator evaluates the equivalent protocols to determine whether an existing canonical form can be used or whether a new canonical form should be generated. The selected or generated canonical form captures the essential protocol behavior while eliminating encoding and metadata variation 909.

Bidirectional transformation mappings are then created, defining how each variant can be converted to and from the canonical form. These mappings include field correspondences, format conversions, and structural reorganizations needed for reversible transformation 910.

The deduplication controller receives the canonical designation and transformation mappings. It coordinates with cache management system 200 to begin the consolidation process 911.

Cache entries are updated to reference the canonical form. Variant identifiers are preserved as aliases, and translation logic ensures backward compatibility for endpoints still using original variants. Active sessions continue uninterrupted through transparent substitution 912.

Each deduplication action is logged. The audit record includes timestamps, similarity scores, applied transformations, cache space saved, and relevant administrative metadata 913.

The semantic index manager updates its indices and protocol relationship graph to reflect the deduplication results, enabling fast lookup of variant-to-canonical mappings in future operations 914.

System 620 interfaces with cache synchronization system 300 to propagate deduplication updates to distributed nodes. Each node receives canonical designations and transformation mappings to ensure consistent cache behavior 915.

Performance monitoring system 400 is notified and begins tracking post-deduplication metrics, including cache space reclaimed, access frequency of canonical forms, translation overhead, and deduplication impact on retrieval latency 916.

Semantic protocol analysis system 620 returns a completion signal to cache management system 200, including statistics on variants consolidated, space recovered, and updated mapping records. These updates inform ongoing cache optimization and storage allocation policies 917.

Figure 10:
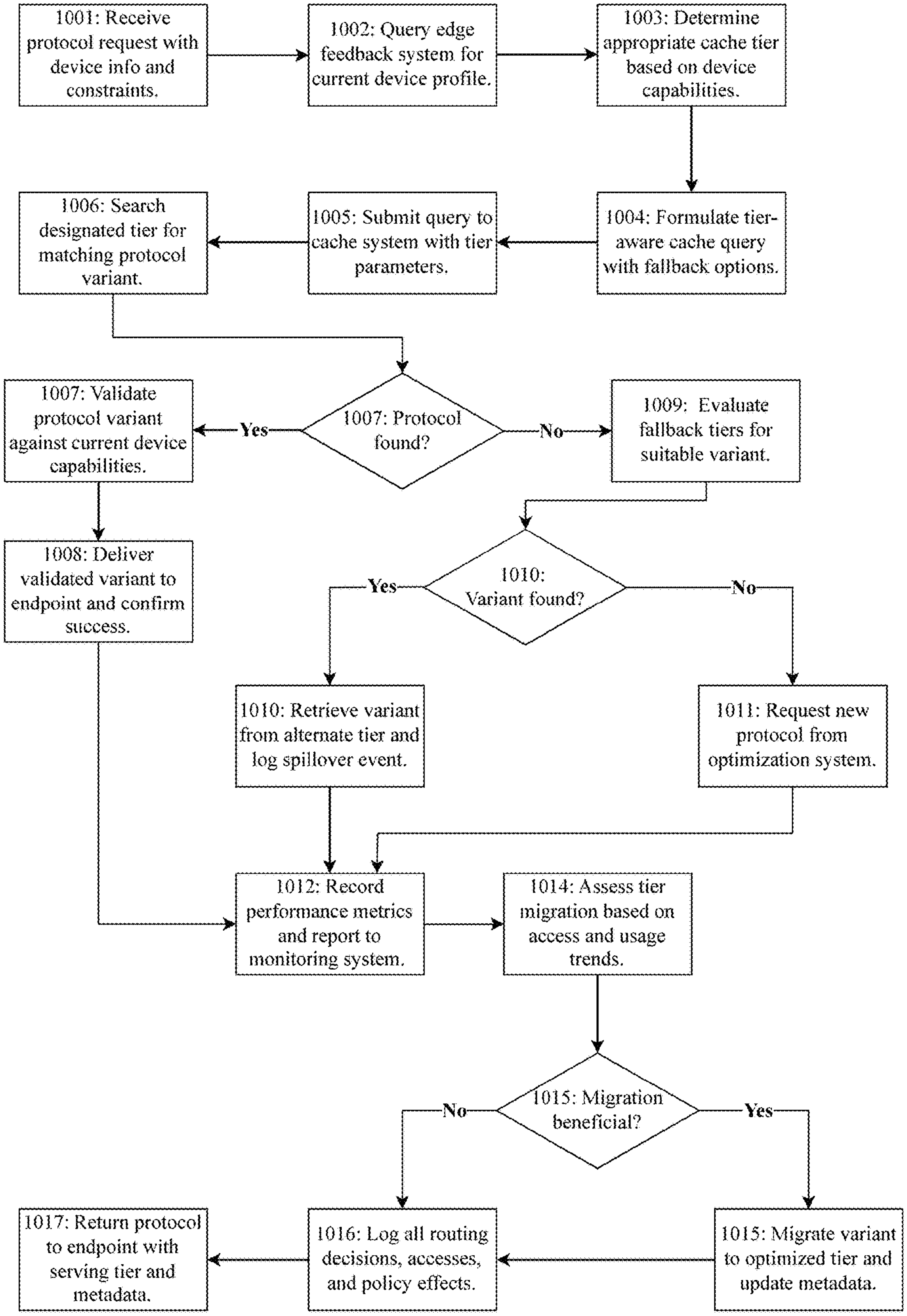
FIG. 10 is a flow diagram illustrating tiered cache request processing, wherein incoming protocol requests are evaluated against tier classifications and routed to appropriate cache levels based on device capabilities and constraint policies.

FIG. 10 is a flow diagram illustrating exemplary tiered cache request processing flow of adaptive protocol cache system 600, in an embodiment.

The process begins when tiered cache coordination system 640 receives a protocol request from an endpoint device. The request is accompanied by device identification information, current operational context, and any protocol requirements or constraints that may influence cache tier selection 1001.

The tier classification service within system 640 extracts device identifiers from the request and queries edge condition feedback system 610 to retrieve the current device profile. The profile includes the device's assigned capability tier, real-time resource availability, network conditions, and recent performance metrics 1002.

Based on the retrieved profile, the tier classification service determines the appropriate cache tier by matching device capabilities against tier definitions. This evaluation considers factors such as available memory for protocol instantiation, processing power for protocol execution, network bandwidth for data transfer, and any special requirements indicated in the request 1003.

The cross-tier coordinator within system 640 receives the tier assignment and formulates a cache query. The query includes the requested protocol identifier, assigned tier designation, constraint parameters from the device profile, and fallback tier options if the primary tier cannot fulfill the request 1004.

The coordinator submits this tier-aware query to cache management system 200 through a non-invasive interface. This interface supplements standard cache lookups with tier-specific parameters, allowing the cache to consider tier metadata without altering core functionality 1005.

Cache manager subsystem 210 processes the query by first checking the designated tier within the cache hierarchy. It evaluates whether any cached variants match both the protocol identifier and the tier-specific constraints included in the query 1006.

If a match is found, the cache manager retrieves the protocol from protocol descriptor storage subsystem 220. It then validates that the variant's resource requirements align with the device's current capabilities as defined in the tier parameters 1007.

Upon successful validation, the system delivers the protocol variant to the requesting endpoint through the appropriate communication channel. The cross-tier coordinator within system 640 monitors delivery to ensure successful transmission and instantiation of the protocol at the endpoint 1008.

If no matching variant is found in the designated tier, the cross-tier coordinator evaluates fallback options. It checks adjacent tiers for compatible variants that could serve the endpoint with acceptable performance trade-offs or constrained resource impact 1009.

If a suitable variant is located in an alternate tier, the coordinator initiates a tier spillover operation. It retrieves the variant from the alternate tier and records the cross-tier access event for future refinement of tier boundaries and population strategies 1010.

If no cached variant exists across any tier, the coordinator triggers a protocol generation request to context-aware protocol optimization system 630. The complete device constraint profile is included to facilitate generation of a variant suited to the endpoint's needs 1011.

While generation is pending—or in parallel with retrieval attempts—the constraint-based policy manager within system 640 evaluates whether the requested protocol should be retained in or promoted to the endpoint's assigned tier. This decision is based on access frequency, population trends, and tier capacity constraints 1012.

The tier performance monitor within system 640 captures request metrics including lookup latency, hit or miss status, spillover events, resource usage during delivery, and endpoint protocol instantiation success. These metrics are transmitted to performance monitoring system 400 1013.

Based on accumulated data and access trends, the tier migration controller within system 640 evaluates whether the protocol should be moved to a different tier. Migration decisions are influenced by device population shifts, usage patterns, and tier utilization statistics 1014.

If migration is warranted, the controller coordinates with cache management system 200 to copy or move the protocol variant to the target tier. Tier metadata is updated to ensure that future requests from similar devices are routed correctly 1015.

Throughout request handling, tiered cache coordination system 640 maintains detailed logs of tier decisions, cross-tier accesses, policy triggers, and performance outcomes. These records enable continuous refinement of tier logic and routing strategies 1016.

The process concludes as system 640 returns the protocol to the endpoint, along with metadata indicating the serving tier, any optimizations applied, and delivery performance. This completes the tier-aware cache request processing cycle 1017.

Figure 11:
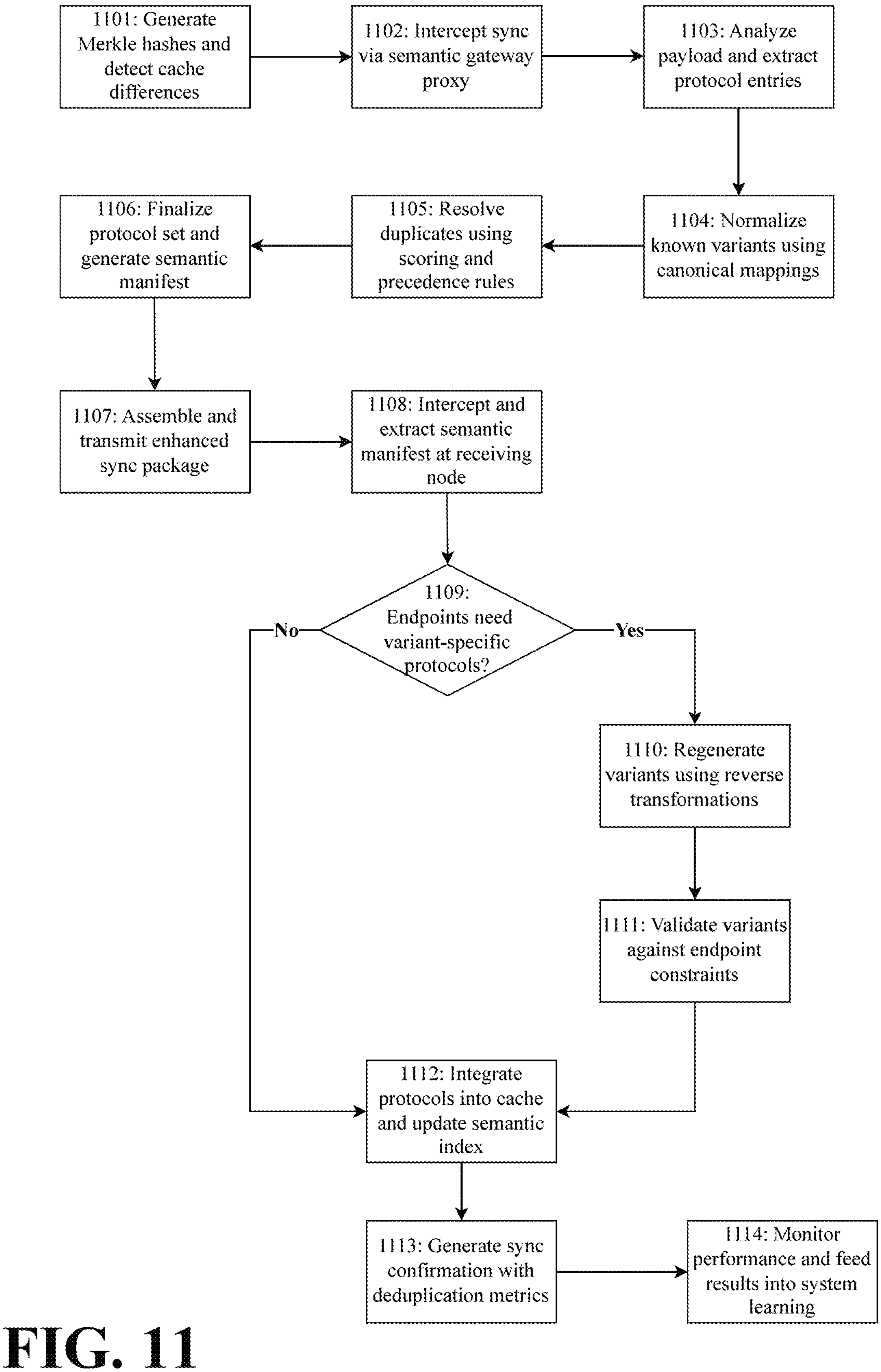
FIG. 11 is a flow diagram depicting enhanced synchronization with semantic processing, including the interception of standard synchronization operations, normalization of protocol variants, resolution of variant conflicts, and orchestration of semantically-optimized synchronization workflows.

FIG. 11 is a flow diagram illustrating exemplary enhanced synchronization of context-aware hash function compression system 800, in an embodiment.

The process begins when a cache synchronization system 300 initiates a synchronization cycle across distributed nodes. A Merkle tree controller 310 generates hashes of modified cache entries and identifies differences between local and remote states 1101.

A semantic preprocessor within a semantic synchronization gateway 650 intercepts the synchronization stream using a transparent proxy. The preprocessor captures synchronization data without disrupting operation of cache synchronization system 300 and maintains compatibility with existing Merkle structures 1102.

The semantic preprocessor parses the intercepted payload to identify protocol entries for transmission. Protocol identifiers, version data, and associated metadata are extracted to evaluate whether semantic processing may reduce synchronization overhead 1103.

For each protocol entry, the semantic preprocessor queries a semantic protocol analysis system 620 for canonical mappings and equivalence relationships. When a known canonical form exists, a protocol normalization service within semantic synchronization gateway 650 applies transformation rules to convert the variant into a canonical representation. Applied changes—such as field reordering, encoding conversion, or metadata normalization—are recorded for full reversibility 1104.

When multiple functionally equivalent variants are identified, a variant resolution engine applies similarity scoring and precedence rules to select a synchronization representative. Criteria may include variant prevalence, node authority level, timestamp priority, or administrative policy settings from a system configuration manager 130 1105.

A semantic sync orchestrator within gateway 650 finalizes the normalized protocol set and recomputes Merkle tree hashes to preserve compatibility with the synchronization protocol. The orchestrator generates a semantic synchronization manifest describing original-to-canonical mappings, resolved conflicts, and deduplication savings 1106.

The semantic sync orchestrator assembles an enhanced differential update containing normalized protocols and the manifest. The update is transmitted to target nodes by an inter-node communication subsystem 350 using standard secure channels 1107.

At each receiving node, a local instance of semantic synchronization gateway 650 intercepts the incoming synchronization package and extracts the semantic manifest. The normalized protocols are prepared for local integration 1108.

A protocol evaluation routine determines whether any connected endpoints require variant-specific forms of the received canonical protocols. A device registry managed by an edge condition feedback system 610 and tier information from a tiered cache coordination system 640 are used to assess endpoint requirements 1109.

When variant delivery is needed, the protocol normalization service applies reverse transformations using the manifest's mapping data. This reconstructs variant-specific encodings and metadata while preserving protocol semantics 1110.

A variant resolution engine validates the regenerated variants against local policy and endpoint constraints, ensuring operational compatibility before use 1111.

A semantic sync orchestrator integrates the updated protocols into a local cache management system 200. This includes updating a protocol descriptor storage subsystem 220 and the semantic index within semantic protocol analysis system 620 1112.

A synchronization confirmation message is generated, including protocol identifiers, transformation logs, deduplication results, and any encountered warnings or errors. The message is returned to cache synchronization system 300 for recordkeeping 1113.

A performance monitoring system 400 receives synchronization metrics from both sender and receiver nodes. These include bandwidth savings, latency improvements, and variant reconstruction overhead. The data is used to refine canonical mapping, equivalence detection, and synchronization strategies in systems 620 and 500 1114.

Figure 12:
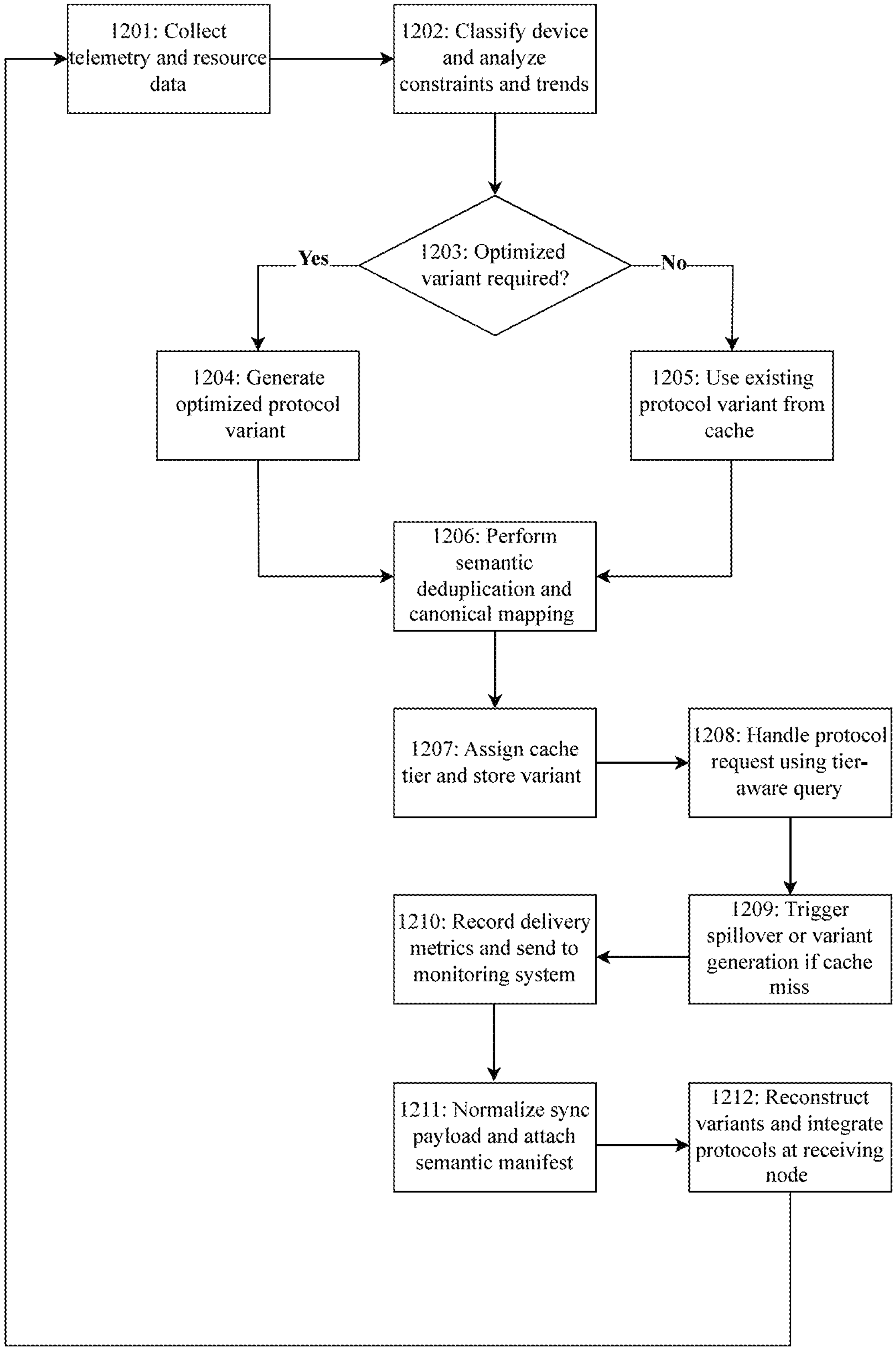
FIG. 12 is a comprehensive system-level flow diagram illustrating integrated operation of the adaptive protocol cache system, from initial device telemetry intake through protocol optimization, deduplication, caching, synchronization, and feedback-driven performance refinement.

FIG. 12 is a flow diagram illustrating exemplary integrated system operation of adaptive protocol cache system 600, in an embodiment. The diagram presents an end-to-end operational cycle from initial endpoint connection through telemetry collection, protocol optimization, semantic deduplication, tiered caching, protocol delivery, distributed synchronization, and performance-driven feedback.

The process begins when an endpoint device connects to the network and transmits device identification and capability data to edge condition feedback system 610. An endpoint telemetry collector within system 610 establishes a monitoring connection and begins collecting real-time metrics such as memory usage, processor load, battery level, and network conditions 1201.

A device classification engine within system 610 assigns the endpoint to a capability tier. A constraint analysis subsystem evaluates potential performance limitations, and an edge analytics engine identifies constraint trends and optimization opportunities across the device population 1202.

Context-aware protocol optimization system 630 receives the device profile and constraint data. A context-aware optimizer determines whether an optimized protocol variant is required for the endpoint. If optimization is needed, system 630 retrieves a base protocol from cache management system 200 and generates a variant tailored to the device's operational context and resource limitations 1203.

If no optimization is needed, an existing protocol variant is selected from cache management system 200 and prepared for delivery 1204.

The optimized or selected variant is then evaluated by semantic protocol analysis system 620. A protocol equivalence engine analyzes behavioral patterns and structural representations to determine whether the variant is functionally equivalent to an existing protocol. If so, a canonical form is selected or generated, and the variant is mapped using bidirectional transformations 1205.

Tiered cache coordination system 640 assigns the appropriate cache tier to the variant and stores it in cache management system 200. Tier metadata and constraint-based scoring are recorded to support efficient retrieval, retention, and eviction strategies 1206.

When the endpoint later requests a protocol, system 640 formulates a tier-aware query and routes it to cache management system 200. If the requested variant is found in the assigned tier, it is delivered to the endpoint. If not, a spillover retrieval is attempted, or a new variant is generated as needed 1207.

Following delivery, a tier performance monitor records metrics such as cache hit status, retrieval latency, and resource utilization. These are transmitted to performance monitoring system 400 to inform future optimization decisions regarding variant retention, tier migration, or generation strategies 1208.

During scheduled or triggered synchronization cycles, cache synchronization system 300 initiates propagation of updated cache contents. Semantic synchronization gateway 650 intercepts outgoing protocol payloads, normalizes the data using canonical mappings, and generates a semantic synchronization manifest to support deduplication and reduce transmission bandwidth 1209.

At the receiving node, semantic synchronization gateway 650 intercepts the incoming synchronization package, extracts the semantic manifest, and determines whether any local endpoints require variant-specific versions. If so, the gateway reconstructs the necessary variants using reverse transformation and validates them against local endpoint constraints before integration into cache management system 200 and semantic protocol analysis system 620 1210.

Synchronization performance metrics, including transmission efficiency, deduplication effectiveness, and variant reconstruction costs, are collected by performance monitoring system 400. This data is used to update semantic protocol analysis system 620 and pre-fetch prediction system 500 for improved future canonical mapping and synchronization behavior 1211.

The system enters a continuous feedback loop. Real-time performance metrics, updated endpoint classifications, and optimized strategy outcomes are used to refine variant generation, tiering policies, and synchronization workflows. Adaptive protocol cache system 600 thereby ensures scalable, efficient, and context-aware communication across heterogeneous device environments 1212.

Exemplary Computing Environment

Figure 13:
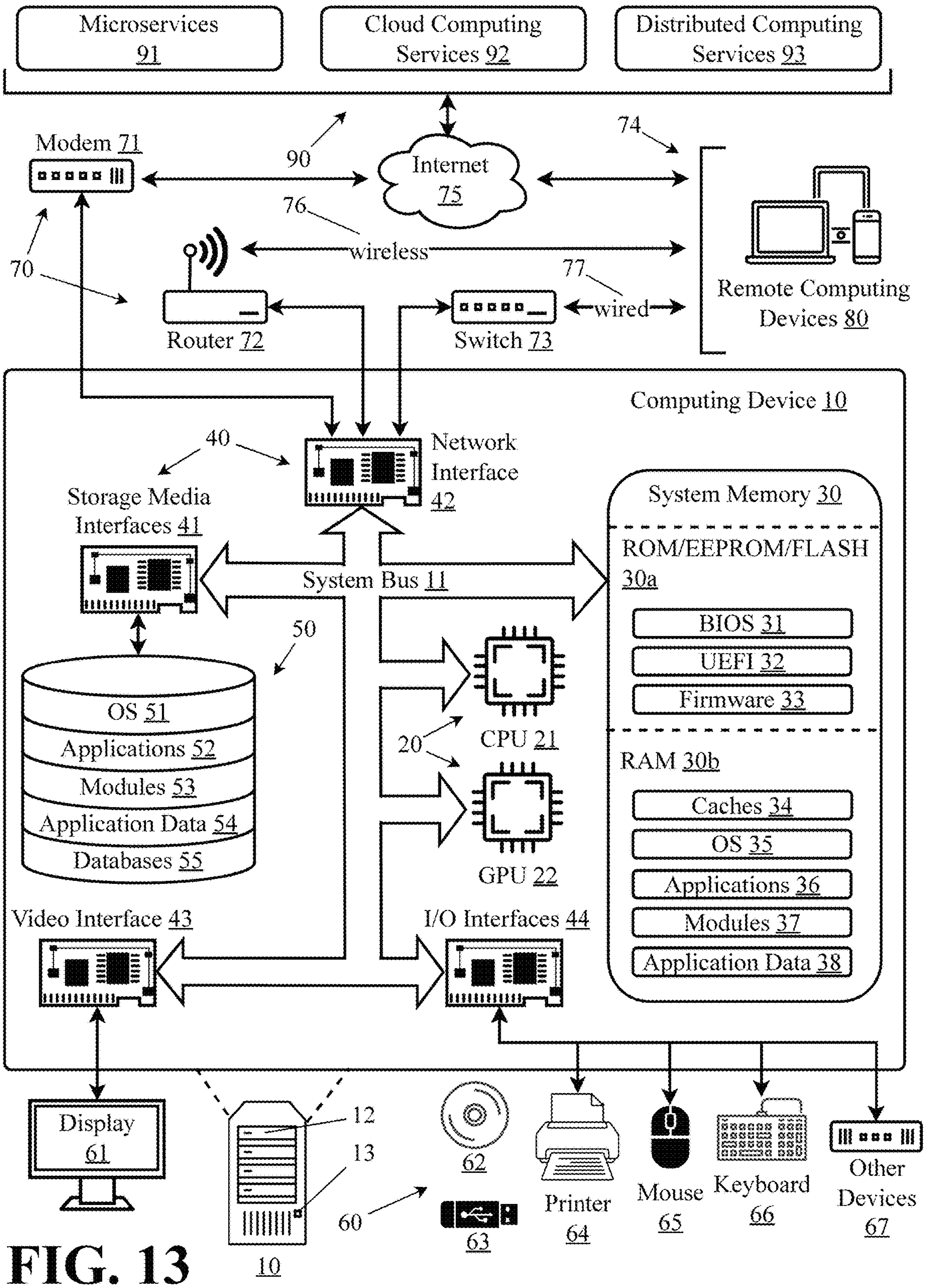
FIG. 13 illustrates an exemplary computing environment on which an embodiment described herein may be implemented.

FIG. 13 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Containerd provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computer system comprising a hardware memory, wherein the computer system is configured to execute software instructions stored on nontransitory machine-readable storage media that:

receive, from an application, a request for propagation information;

generate a protocol descriptor;

encapsulate the protocol descriptor into a packet;

transmit the packet between applications;

decode a received protocol descriptor;

process communication protocol based on the decoded protocol descriptor;

analyze network traffic to determine a current network context, the current network context comprising one or more measured network conditions including at least one of available bandwidth, latency, and packet loss rate;

collect, via a telemetry collection module and from an endpoint device, endpoint telemetry data, the endpoint telemetry data comprising two or more of a processor class, an amount of available memory, a power state, a network interface type, and a set of supported protocol versions of the endpoint device;

classify, via a device classification engine and based on the endpoint telemetry data, the endpoint device into one of a plurality of capability tiers, each capability tier corresponding to a respective range of device resource constraints;

predict a communication need of the endpoint device based on historical protocol access patterns associated with the endpoint device, the current network context, and the capability tier into which the endpoint device is classified;

determine a candidate protocol modification by performing a structural analysis that compares message patterns and state machine transitions of the communication protocol against the device resource constraints of the capability tier;

generate, via a protocol adaptation engine and based on the candidate protocol modification and the capability tier, a protocol variant of the communication protocol by applying to the communication protocol one or more transformations comprising at least one of field truncation, timeout value adjustment, and compression level adjustment, wherein the protocol variant preserves message semantics and state machine logic of the communication protocol;

update the protocol descriptor to reference the protocol variant in response to determining that a resource consumption of the protocol variant satisfies the device resource constraints of the capability tier;

translate between the communication protocol and a second communication protocol when required for communication between the endpoint device and a second endpoint device; and facilitate communication with the endpoint device using the protocol variant.

2. The computer system of claim 1, wherein the computer system maintains a multi-level protocol cache structure comprising local, regional, and global cache levels, and wherein the cache structure is organized into device-capability-based tiers that store protocol variants generated for respective ones of the plurality of capability tiers.

3. The computer system of claim 2, wherein the computer system performs protocol deduplication of cached protocols by identifying functionally equivalent protocol variants through comparison of message flow patterns and behavioral characteristics, and maintains canonical protocol representations to reduce cache redundancy.

4. The computer system of claim 2, wherein the computer system synchronizes contents of the multi-level protocol cache structure across distributed nodes using a Merkle tree structure enhanced with protocol normalization processing that converts protocol variants to standardized forms before synchronization to reduce bandwidth usage during the synchronization.

5. The computer system of claim 1, the telemetry collection module establishes a persistent connection with the endpoint device and adjusts a sampling rate of the endpoint telemetry data based on a stability of the endpoint device, and wherein the device classification engine refines the plurality of capability tiers based on observed performance data of one or more endpoint devices.

6. The computer system of claim 1, wherein generating the protocol variant comprises creating, via the protocol adaptation engine, an endpoint-specific protocol appendix that maintains compatibility with the communication protocol while adapting message structures, timeout values, and compression levels to the device resource constraints of the capability tier.

7. The computer system of claim 3, wherein identifying functionally equivalent protocol variants comprises extracting protocol characteristics into feature vectors, comparing message sequences and state machine transitions across protocol variants, and generating protocol fingerprints that enable identification of functionally equivalent protocols despite syntactic differences.

8. The computer system of claim 2, wherein the computer system implements constraint-based cache eviction policies through an eviction controller that considers endpoint-specific resource limitations and a measured success rate of the protocol variant in endpoint communications in addition to usage frequency when determining cache retention.

9. The computer system of claim 4, wherein protocol normalization processing includes protocol structure standardization, variant resolution using similarity scoring algorithms, and generation of differential updates that account for canonical representation mappings across cache nodes.

10. A method comprising:

receiving, from an application, a request for propagation information;

generating a protocol descriptor;

encapsulating the protocol descriptor into a packet;

transmitting the packet between applications;

decoding a received protocol descriptor;

processing a communication protocol based on the decoded protocol descriptor;

analyzing network traffic to determine a current network context, the current network context comprising one or more measured network conditions including at least one of available bandwidth, latency, and packet loss rate;

collecting, via a telemetry collection module and from an endpoint device, endpoint telemetry data, the endpoint telemetry data comprising two or more of a processor class, an amount of available memory, a power state, a network interface type, and a set of supported protocol versions of the endpoint device;

classifying, via a device classification engine and based on the endpoint telemetry data, the endpoint device into one of a plurality of capability tiers, each capability tier corresponding to a respective range of device resource constraints;

predicting a communication need of the endpoint device based on (i) historical protocol access patterns associated with the endpoint device, (ii) the current network context, and (iii) the capability tier into which the endpoint device is classified;

determining a candidate protocol modification by performing a structural analysis that compares message patterns and state machine transitions of the communication protocol against the device resource constraints of the capability tier;

generating, via a protocol adaptation engine and based on the candidate protocol modification and the capability tier, a protocol variant of the communication protocol by applying to the communication protocol one or more transformations comprising at least one of field truncation, timeout value adjustment, and compression level adjustment, wherein the protocol variant preserves message semantics and state machine logic of the communication protocol;

updating the protocol descriptor to reference the protocol variant in response to determining that a resource consumption of the protocol variant satisfies the device resource constraints of the capability tier;

translating between the communication protocol and a second communication protocol when required for communication between the endpoint device and a second endpoint device; and facilitating communication with the endpoint device using the protocol variant.

11. The method of claim 10, wherein the method maintains a multi-level protocol cache structure comprising local, regional, and global cache levels, and wherein the cache structure is organized into device-capability-based tiers that store protocol variants generated for respective ones of the plurality of capability tiers.

12. The method of claim 11, wherein the method performs protocol deduplication of cached protocols by identifying functionally equivalent protocol variants through comparison of message flow patterns and behavioral characteristics, and maintains canonical protocol representations to reduce cache redundancy.

13. The method of claim 11, wherein the method synchronizes contents of the multi-level protocol cache structure across distributed nodes using a Merkle tree structure enhanced with protocol normalization processing that converts protocol variants to standardized forms before synchronization to reduce bandwidth usage during the synchronization.

14. The method of claim 10, wherein the telemetry collection module establishes a persistent connection with the endpoint device and adjusts a sampling rate of the endpoint telemetry data based on a stability of the endpoint device, and wherein the device classification engine refines the plurality of capability tiers based on observed performance data of one or more endpoint devices.

15. The method of claim 10, wherein generating the protocol variant comprises creating, via the protocol adaptation engine, an endpoint-specific protocol appendix that maintains compatibility with the communication protocol while adapting message structures, timeout values, and compression levels to the device resource constraints of the capability tier.

16. The method of claim 12, wherein identifying functionally equivalent protocol variants comprises extracting protocol characteristics into feature vectors, comparing message sequences and state machine transitions across protocol variants, and generating protocol fingerprints that enable identification of functionally equivalent protocols despite syntactic differences.

17. The method of claim 11, wherein the method implements constraint-based cache eviction policies through an eviction controller that considers endpoint-specific resource limitations and a measured success rate of the protocol variant in endpoint communications in addition to usage frequency when determining cache retention.

18. The method of claim 13, wherein protocol normalization processing includes protocol structure standardization, variant resolution using similarity scoring algorithms, and generation of differential updates that account for canonical representation mappings across cache nodes.

* * * * *